(12) United States Patent
Tarui et al.

(10) Patent No.: US 7,472,179 B2
(45) Date of Patent: Dec. 30, 2008

(54) SYSTEM MANAGEMENT METHOD FOR A DATA CENTER

(75) Inventors: Toshiaki Tarui, Sagamihara (JP); Tatsuo Higuchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 657 days.

(21) Appl. No.: 10/969,192

(22) Filed: Oct. 21, 2004

(65) Prior Publication Data

US 2005/0114507 A1 May 26, 2005

(30) Foreign Application Priority Data

Nov. 14, 2003 (JP) ............... 2003-384985

(51) Int. Cl.
*G06F 15/173* (2006.01)
(52) U.S. Cl. ............... 709/223; 709/220; 709/224
(58) Field of Classification Search ............... 709/220, 709/223, 224, 203, 218, 219
See application file for complete search history.

(56) References Cited

U.S. PATENT DOCUMENTS

| | | | | |
|---|---|---|---|---|
| 5,917,899 A | * | 6/1999 | Moss et al. | 379/221.08 |
| 6,978,314 B2 | * | 12/2005 | Tarr | 709/245 |
| 6,988,208 B2 | * | 1/2006 | Hrabik et al. | 726/23 |
| 2003/0009551 A1 | | 1/2003 | Benfield et al. | |
| 2003/0200311 A1 | * | 10/2003 | Baum | 709/224 |
| 2005/0030955 A1 | * | 2/2005 | Galin et al. | 370/401 |

* cited by examiner

*Primary Examiner*—Ario Etienne
*Assistant Examiner*—El Hadji M Sall
(74) *Attorney, Agent, or Firm*—Mattingly, Stanger, Malur & Brundidge, P.C.

(57) ABSTRACT

Changes such as addition or removal of a device in a system composed of a number of devices are automatically detected and the physical location of the devices is managed. A management method of this invention includes a step (S502) of detecting the physical location of servers (S1 through S3) connected to a network switch (2) that is to be monitored, steps (S512 and S513) of collecting a globally unique MAC address which is unique to equipment of the servers (S1 through S3) connected to the network switch (2) and is not shared by the equipments, and a step (S517) of creating configuration information from the MAC address and from the physical connection location of the network switch (2).

26 Claims, 21 Drawing Sheets

FIG. 2

| PORT | STATE |
|------|-------|
| 1    | ON    |
| 2    | ON    |
| 3    | OFF   |
| ⋮    | ⋮     |

21, P1 → row 1, P2 → row 2

FIG. 3

| PORT | MAC ADDR          |
|------|-------------------|
| 1    | 00:aa:bb:cc:dd:ee |
| 2    | 00:aa:bb:cc:dd:ff |
| 3    |                   |
| ⋮    | ⋮                 |

22, P1 → row 1, P2 → row 2, MAC1, MAC2

FIG. 4

| IP ADDR       | MAC ADDR          |
|---------------|-------------------|
| 192.168.1.10  | 00:aa:bb:cc:dd:ee |
| 192.168.1.11  | 00:aa:bb:cc:dd:ff |
|               |                   |
| ⋮             | ⋮                 |

23, IP1, IP2, MAC1, MAC2

FIG. 5A

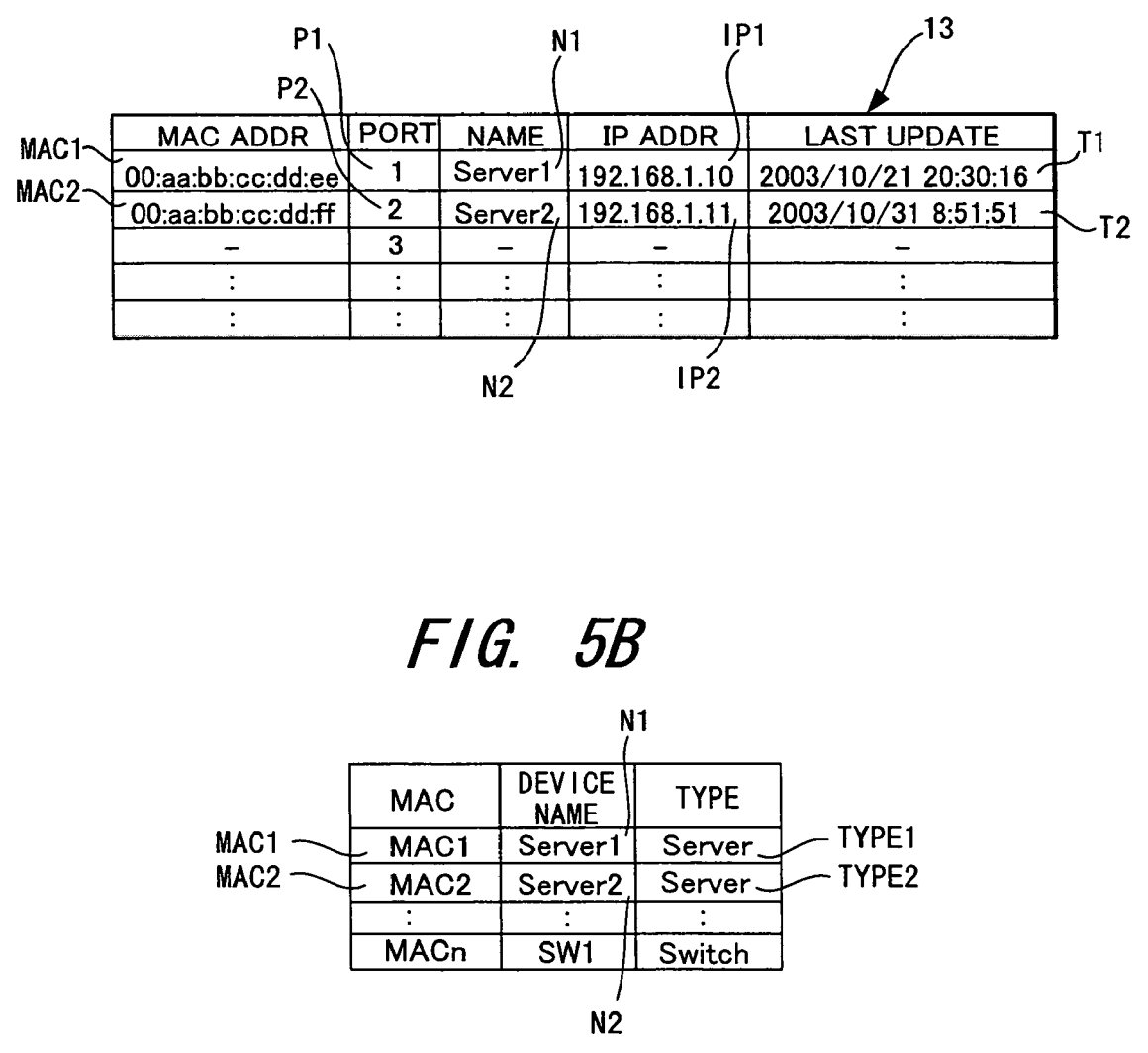

| MAC ADDR | PORT | NAME | IP ADDR | LAST UPDATE |
|---|---|---|---|---|
| 00:aa:bb:cc:dd:ee | 1 | Server1 | 192.168.1.10 | 2003/10/21 20:30:16 |
| 00:aa:bb:cc:dd:ff | 2 | Server2 | 192.168.1.11 | 2003/10/31 8:51:51 |
| – | 3 | – | – | – |
| ⋮ | ⋮ | ⋮ | ⋮ | ⋮ |
| ⋮ | ⋮ | ⋮ | ⋮ | ⋮ |

FIG. 5B

| MAC | DEVICE NAME | TYPE |
|---|---|---|
| MAC1 | Server1 | Server |
| MAC2 | Server2 | Server |
| ⋮ | ⋮ | ⋮ |
| MACn | SW1 | Switch |

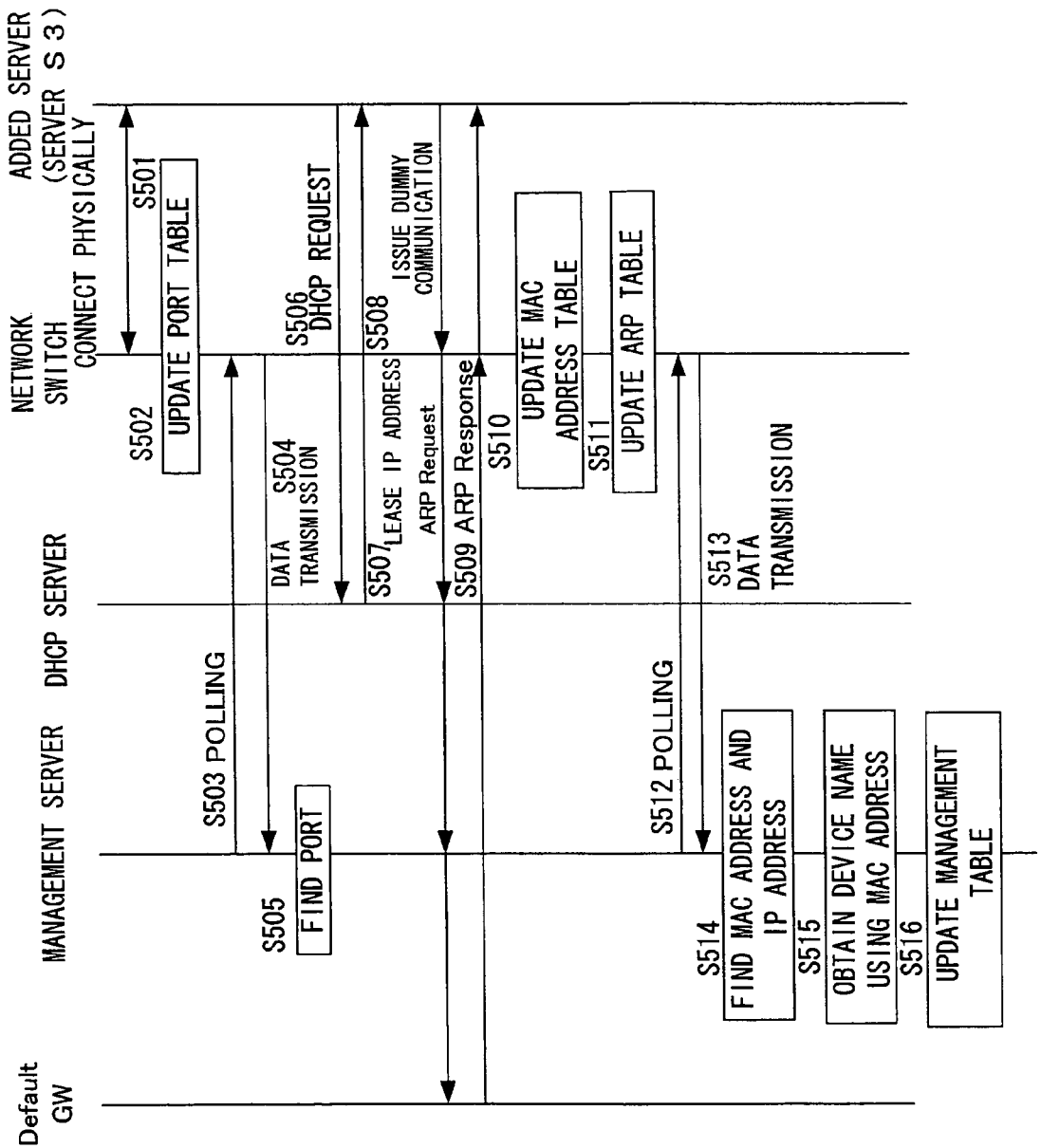

FIG. 15

| | MAC ADDR | PORT | NAME | IP ADDR | APPLICATION GROUP | LAST UPDATE | |
|---|---|---|---|---|---|---|---|
| MAC1 — | MAC1 | 1 | Server1 | 192.168.1.10 | A | 2003/10/20 20:30:16 | — T1 |
| MAC2 — | MAC2 | 2 | Server2 | 192.168.1.11 | A | 2003/10/31 08:50:51 | — T2 |
| | MAC3 | 3 | Server3 | 192.168.1.12 | B | 2003/09/01 17:23:32 | |
| | MAC4 | 4 | Server4 | 192.168.1.13 | B | 2003/10/03 07:15:08 | |
| | : | : | : | : | : | : | |

P1, P2 → PORT; N1, N2 → NAME; IP1, IP2 → IP ADDR; G1, G2 → APPLICATION GROUP

DISPLAY IN HIGHLIGHT

SYSTEM MANAGEMENT METHOD FOR A DATA CENTER

CLAIM OF PRIORITY

The present application claims priority from Japanese application JP 2003-384985 filed on Nov. 14, 2003, the content of which is hereby incorporated by reference into this application.

BACKGROUND

This invention relates to a method of centralizing management of a number of computers and network devices, and more specifically to an improved method of managing a number of devices for a data center automatically.

In a computer system used in a data center, carrier, or enterprise, a system composed of many devices (server and other computers, network devices such as routers, network switches, and load balancers, disk arrays and other storage systems, etc.) is run by intricate cooperation of the devices, a management server (a computer which executes management software) is employed to manage the system efficiently.

Configuration information of the devices which is basic information in management of the system performed by the management server is updated manually when there is a change in the devices.

Manually inputted configuration information has to be checked for its correctness to eliminate typing errors and the like. This is a problem for middle to large-sized data centers since finding out of the many devices the one that has been modified takes a lot of labor.

Automatic system configuration information collection has been proposed to reduce the labor of manually updating configuration information. One of known techniques of automatically collecting system configuration information is to scan the entire network of a data center to find a newly added device (US 2003/9551 A).

SUMMARY

In US 2003/9551 A, a new device is found by its IP address. If a wrong IP address is set to a newly added device, incorrect configuration information is created. In addition, it is very difficult to tell whether a device added to the system is correct or not despite the device having a wrong IP address.

Maintenance of devices in a data center requires detailed configuration information including physical connection locations of the devices, for example, which device is connected to which port of which network switch. The technique according to US 2003/9551 A is incapable of specifying a physical connection location. Therefore a system employing the technique still needs manual input of connection location information of a device that has undergone a change, and it does not help in saving labor.

Furthermore, in a large-sized data center whose network covers a wide area, it takes long to scan the entire network one round and capture configuration information according to US 2003/9551 A. Scanning the entire network also increases network traffics of a data center, weighing down the network bandwidth which is to be used for the original operation.

This invention has been made in view of the problems described above, and it is therefore an object of this invention to provide a method of automatically detecting addition, removal and other changes in a number of devices constituting a system and managing physical connection locations of the devices by obtaining detailed system configuration information.

This invention detects the physical connection location of a host computer, or network device, connected to a network device that is to be monitored and collects a first identifier which is globally unique to one equipment of this host computer or network device connected to the network device to be monitored (no two equipments share the same first identifier). System configuration information is created from the physical connection location and the first identifier.

As a new device (host computer or network device) is connected to a network device to be monitored, the physical connection location of the new device is detected, a first identifier globally unique to equipment of the device in the detected connection location is collected, and configuration information is created from the physical connection location in the network device and from the first identifier. This invention can thus automatically detect a device added to a system, and is capable of correctly recognizing the physical location of the added device and identifying the added device. This makes it possible to judge quickly and easily whether the added device is correct or not, and to manage quickly and easily the system configuration of a data center that is constituted of many devices.

Moreover, with device's connection location and details of individual devices recognized, this invention can point out human error in adding a device, changing a connection, and the like promptly and with precision, and accordingly can improve the efficiency of maintenance work in the data center.

BRIEF DESCRIPTION OF THE DRAWINGS

FIG. 2 is an explanatory diagram showing a port table.

FIG. 3 is an explanatory diagram showing a MAC address table.

FIG. 4 is an explanatory diagram showing an ARP table.

FIG. 5A is an explanatory diagram showing a management table.

FIG. 5B is an explanatory diagram showing a device management table.

FIG. 6 is a sequence diagram for communications between a management server, a network switch, a server to be added, and a default gateway that is set to a server S3 in advance.

FIG. 15 is an explanatory diagram showing a management table.

DETAILED DESCRIPTION OF THE PREFERRED EMBODIMENTS

An embodiment of this invention will be described below with reference to the accompanying drawings.

Figure 1:
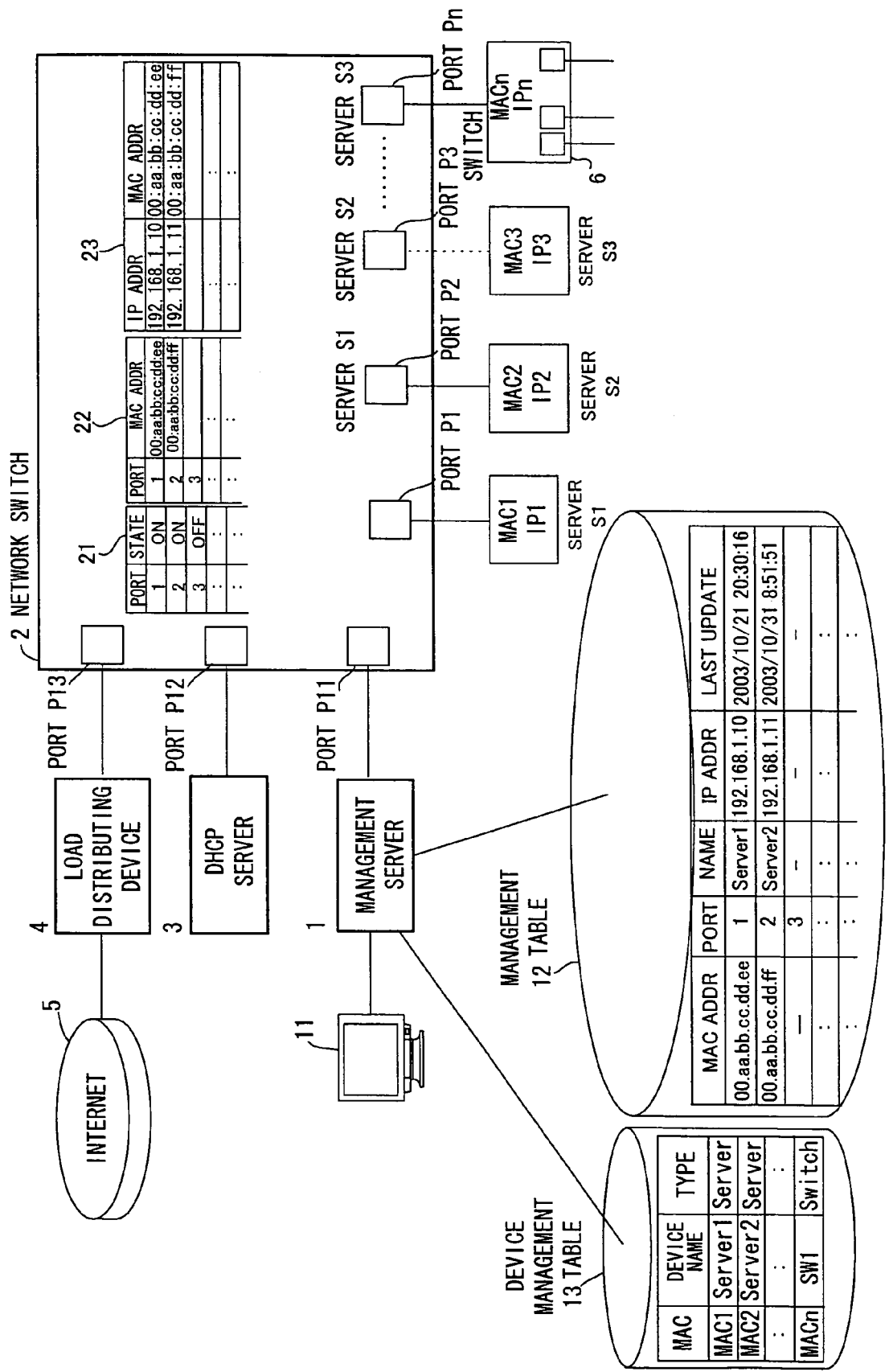
FIG. 1 is a system diagram showing the configuration of a data center.

FIG. 1 shows an example of the data center configuration. Servers S1 through S3, a network switch 6, a DHCP server 3, and a load balancer 4 are connected to a network switch 2 to constitute a system. The servers S1 through S3 execute an application or applications. The network switch 6 connects other servers or the like to the system. The DHCP server 3 lends each device an IP address. The load balancer 4 is connected to Internet 5 to adjust the load of the intra network servers S1 through S3. The network switches 2 and 6, the load balancer 4 and others are network devices of the data center while the servers S1 through S3 and the DHCP server 3 are host computers.

A management server 1 which manages the above-described servers, load balancer 4 and network switches 2 and 6 is connected to the network switch 2 via an intra network (e.g., a LAN such as Ethernet). The management server 1 executes management software to manage the system in the data center which is composed of the devices and the intra network. Other than a LAN, a serial interface such as RS232C may be employed to connect the management server 1 to the network switches 2 and 6.

The management software is executed in the management server 1 to monitor the devices that are monitoring subjects (for example, the servers S1 through S3, the network switch 2, and the load balancer 4).

The management server 1 comprises a CPU, a memory, an external storage system, and an interface (omitted from the drawing) to execute the management software. The management server 1 also has a display 11, which displays the management status, and a keyboard and a mouse (not shown).

The network switch 2 has plural (n) ports P1 to Pn. The management server 1 is connected to the port P11. The DHCP server 3 is connected to the port P12. The load balancer 4, which functions as a gateway to the intra network, is connected to the port P13. The server S1 is connected to the port P1. The server S2 is connected to the port P2. The cascaded network switch 6 is connected to the port Pn. A broken line is drawn between the port P3 and the server S3 in FIG. 1 to indicate that the port P3 and the server S3 are not connected to each other yet.

The server S1 has an IP address (IP1 in the drawing) leased by the DHCP server 3. A network interface (not shown) of the server S1 has a MAC (Media Access Control) address (MAC1 in the drawing), which is a globally unique identifier (no two equipments share the same address). Similarly, the server S2 has an IP address IP2 leased by the DHCP sever 3 and a MAC address MAC2 is set to its network interface. The cascaded network switch 6 has an IP address IPn leased by the DHCP sever 3 and a MAC address MACn is set to its network interface. The server S3, which is not connected yet, has no IP address but a MAC address MAC 3 is set to its network interface.

The network switch 2 has a port table 21, which shows whether devices are connected to the respective ports P1 to Pn or not, a MAC address table 22, which shows the association between the devices connected to the ports P1 to Pn and MAC addresses, and an ARP (Address Resolution Protocol) table 23, which shows the association between the MAC addresses of the devices and IP addresses.

The network switch 2 also has a control unit and a storage system (RAM or the like) (not shown). The control unit monitors the communication state of the ports P1 to Pn, updates the port table 21, the MAC address table 22 and the ARP table 23, and stores the update in the storage system. The network switch 2 sends the contents of the tables in response to a request from the management server 1.

An example of the port table 21 is shown in FIG. 2. In FIG. 2, each row of the port table 21 has a port number field (PORT), which holds a port number (1 through n), and a state field (STATE), which bears either "ON" or "OFF" to indicate the state of the corresponding port. "ON" indicates that a device is connected to this port while "OFF" indicates that no device is connected to this port. For instance, "ON" is set to the state fields corresponding to the port numbers 1 and 2 in the port table 21 since the servers S1 and S2 are connected to the ports P1 and P2 of FIG. 1, respectively, while "OFF" is set to the state field corresponding to the port number 3 since no device is connected to the port P3.

The management server 1 detects a port to which a device is connected by reading the port table 21.

An example of the MAC address table is shown in FIG. 3. In FIG. 3, each row of the MAC address table 22 has a port number field (PORT), which holds a port number (1 through n), and a MAC address field (MAC ADDR), which bears a MAC address unique to a device that is connected to the corresponding port.

For instance, when the servers S1 and S2 respectively connected to the ports P1 and P2 of FIG. 1 execute communication, the network switch 2 extracts a sender MAC address from a sent packet and sets the sender MAC address to the MAC address field (shown in FIG. 3) corresponding to the port number of the port from which the packet is sent, so the MAC address MAC 1 (00:aa:bb:cc:dd:ee) of the server S1 is set to the address field for the port number 1 while the MAC address MAC2 (00:aa:bb:cc:dd:ff) of the server S2 is set to the address field for the port number 2.

The management server 1 can detect the physical connection location of a device (which device is connected to which port) by reading the MAC address table 22. The MAC address, which is a globally unique identifier (no two equipments share the same address), enables the management server 1 to identify devices connected to the ports P1 to Pn with ease.

An example of the ARP table is shown in FIG. 4. In FIG. 4, each row of the ARP table 23 has an IP address field (IP in the drawing) and a MAC address field (MAC ADDR in the drawing) to which a MAC address unique to a device that has the corresponding IP address is set.

For instance, when the servers S1 and S2 respectively connected to the ports P1 and P2 of FIG. 1 communicate, the network switch 2 extracts a sender MAC address and a sender IP address from a sent packet, and sets MAC1 (00:aa:bb:cc:dd:ee), which is the sender MAC address of the server S1, and MAC2 (00:aa:bb:cc:dd:ff), which is the sender MAC address of the server S2, to the MAC address fields, while setting IP1 (192.168.1.10), which is the sender IP address of the server S1, and IP2 (192.168.1.11), which is the sender IP address of the server S2, to the IP address fields.

The management server 1 reads the ARP table 23 to grasp the association between the MAC address, which is a physical identifier unique to each device, and the IP address, which is a logical identifier unique throughout the intra network (an identifier on a network). From the association between the MAC address and the IP address, the management server 1 can recognize whether the added device is correct or not as will be described later.

The network switch 2 always monitors the ports P1 to Pn to update the port table 21, the MAC address table 22, and the ARP table 23 as those exemplified above.

The management server 1 collects, as will be described later, the port number, the MAC address, and the IP address in the above-described tables from the network switch 2, and creates a management table 12 as the one shown in FIG. 5A.

The management table 12 stores on each row the obtained information, namely, the MAC address, the port number, the device name, the IP address, and the date and time of update, in the order stated. Stored on the first row in FIG. 5A is the MAC address, port number, device name, and IP address of the server S1, which are MAC1, P1, N1, and IP1, respectively, and the last update time and date of the server S1. Information of other devices is sequentially stored on the subsequent rows.

Based on the management table 12, the management server 1 recognizes the physical connection location (port number) of a device connected to the network switch 2, and identifies the device (MAC address) and its logical identifier (IP address).

The management server 1 updates, as a device is added or removed, the management table 12 by creating or deleting a row (entry) of the table. The system configuration information thus can be kept up to date. Although not shown in the drawing, the management server 1 has another management table 12 for the network switch 2 to keep track of configuration information for every device in the intra network (sub-net, for instance).

The management server 1 also has a device management table 13, which associates the MAC address of a server in the system with a device name. The device management table 13 is shown in FIG. 5B and is created and managed by a system administrator. Each time a new server is introduced to the system, a MAC address, a device name (e.g., equipment management number) N1, N2 or the like necessary for the administrator to recognize the added server, and a device type TYPE1, TYPE2, or the like are inputted in an associated manner. The administrator manages equipments by device names.

A description will be given below on a procedure for the management server 1 to obtain device configuration information taking, as an example the case in which the server S3 of FIG. 1 is added to the system by being connected to the port P3 of the network switch 2.

FIG. 6 is a sequence diagram for communications between the management server 1, the network switch 2, the server S3 to be added, and a default gateway (for example, the load balancer 4) set to the server S3 in advance.

First, the server S3 is physically connected to the port P3 of the network switch 2 (the step S501). Upon addition of the server S3, the network switch 2 which monitors the ports P1 to Pn updates the state field in the port table 21 that corresponds to the port number 3 from OFF to ON (the step S502).

The management server 1 executes polling at a given cycle (e.g., for every few seconds) (the step S503) and obtains values of the tables 21 to 23 from the network switch 2 (the step S504).

The management server 1 finds out addition of a new device connected to the port P3 of the network switch 2 from the fact that the state field in the port table 21 of the network switch 2 that corresponds to the port number 3 has been changed from OFF to ON (the step S505). As the new port is found, the management server 1 adds an entry for the port P3 to the management table 12. In the case where an existing port is changed from ON to OFF, the management server 1 deletes the entry of the management table 12 that corresponds to the port number of this port.

The newly added server S3 requests an IP address from the DHCP server 3 (the step S506). The DHCP server 3 sends in response a given IP address (IP3) to the server S3, which sets the received IP address IP3 as its own IP address (the step S507). It is not always necessary to obtain an IP address from the DHCP server but instead an IP address may be set in advance to a server to be added. In this case, the steps S506 and S507 are omitted and addition of the server is immediately followed by the step S508 for a dummy communication.

Obtaining the IP address, the added server S3 issues a dummy communication to the given default gateway (load balancer 4) through processing described later (the step S508). Since the server 3 is yet to obtain the MAC address of the default gateway (load balancer 4) at this point, the server S3 broadcasts an ARP request within the sub-net. The dummy communication may not always be ARP access to the default gateway and may be arbitrary access to an arbitrary server (PING, for example).

The default gateway sends an ARP in response to the ARP request to notify the server S3 of the MAC address of the default gateway (the step S509).

From a packet of the dummy communication by the server S3 in the step S508, the network switch 2 which monitors the ports P1 to Pn extracts the MAC address and IP address of the server S3, adds the MAC address of the server S3, namely, MAC3, to the MAC address table, and adds the IP address of the server S3 that is associated with the MAC address MAC3, namely IP3, to the ARP table 23 (steps S510 and S511).

The management server 1 executes polling on the network switch 2 at a given cycle (the step S512), and obtains the values of the tables 21 to 23 (the step S513). Then the management server 1 compares the obtained values against the management table 12 to find, in the MAC address table 22 and the ARP table 23, as a new device, MAC3 and IP3 corresponding to the server S3 (the step S514).

The management server 1 searches the device management table 13 using the new MAC address and obtains the device name of the server (the step S515).

The management server 1 adds the MAC address MAC3, the IP address IP3, and the obtained device name to the entry for the port P3 that has been created in the management table 12, and keeps configuration information of the newly added server S3 (the step S516).

As has been described, through the periodical polling on the network switch 2, the management server 1 can detect a change in a device of the intra network and automatically update the management table 12. This enables the management server 1 to recognize the physical location of a new device and identify the device with the use of existing port numbers of the network switch 2 and the MAC address which is a globally unique identifier, and to locate the logical position of the added device on the network with the use of the IP address set to the added device.

The polling processing by the management server 1 which is shown in FIG. 6 will be described next with reference to a flow chart of FIG. 7.

First, in a step S101, polling is performed on the network switch 2, which is a network device to be managed, and a transmission request is made to the tables 21 to 23 to receive the values of the tables 21 to 23 from the network switch 2.

In a step S102, the current management table 12 which holds the previous values is compared against the values in the tables 21 to 23.

In a step S103, the comparison results are used to judge whether there is a change in link state of the ports P1 to Pn of the network switch 2 or not. In the case where the ON/OFF state has been changed for any of the ports P1 to Pn, the procedure proceeds to a step S104 to add or delete the entry for the corresponding port number. On the other hand, in the case where there is no change in link state, the procedure proceeds to a step S106.

In a step S105, the current date and time are stored as a time when the change has happened.

In the step S106, the comparison results in the step S102 are used to judge whether there is a new MAC address or not. When a new MAC address is found, the obtained MAC address is added to the entry that has been added in the step S104. When there is no change in MAC address, on the other hand, the procedure proceeds to a step S109.

In a step S108, the device management table 13 is searched with the obtained MAC address to retrieve the name of the device newly added (the step S515 of FIG. 6).

In the step S109, the comparison results in the step S102 are used to judge whether there is a new IP address or not. When a new IP address is found, the procedure proceeds to a step S110 to store this IP address.

In a step S111, whether or not there is a change in system configuration is judged. A change in system configuration advances the procedure to a step S112 while no change ends the processing.

In the step S112, which is reached by a change in system, the management table 12 is updated to reflect the above port number, MAC address, IP address, update time and date, and device name. In a step S113, these contents of the management table 12 are displayed on the display 11, where the configuration information for the newly added or deleted port number is highlighted.

Figure 8:
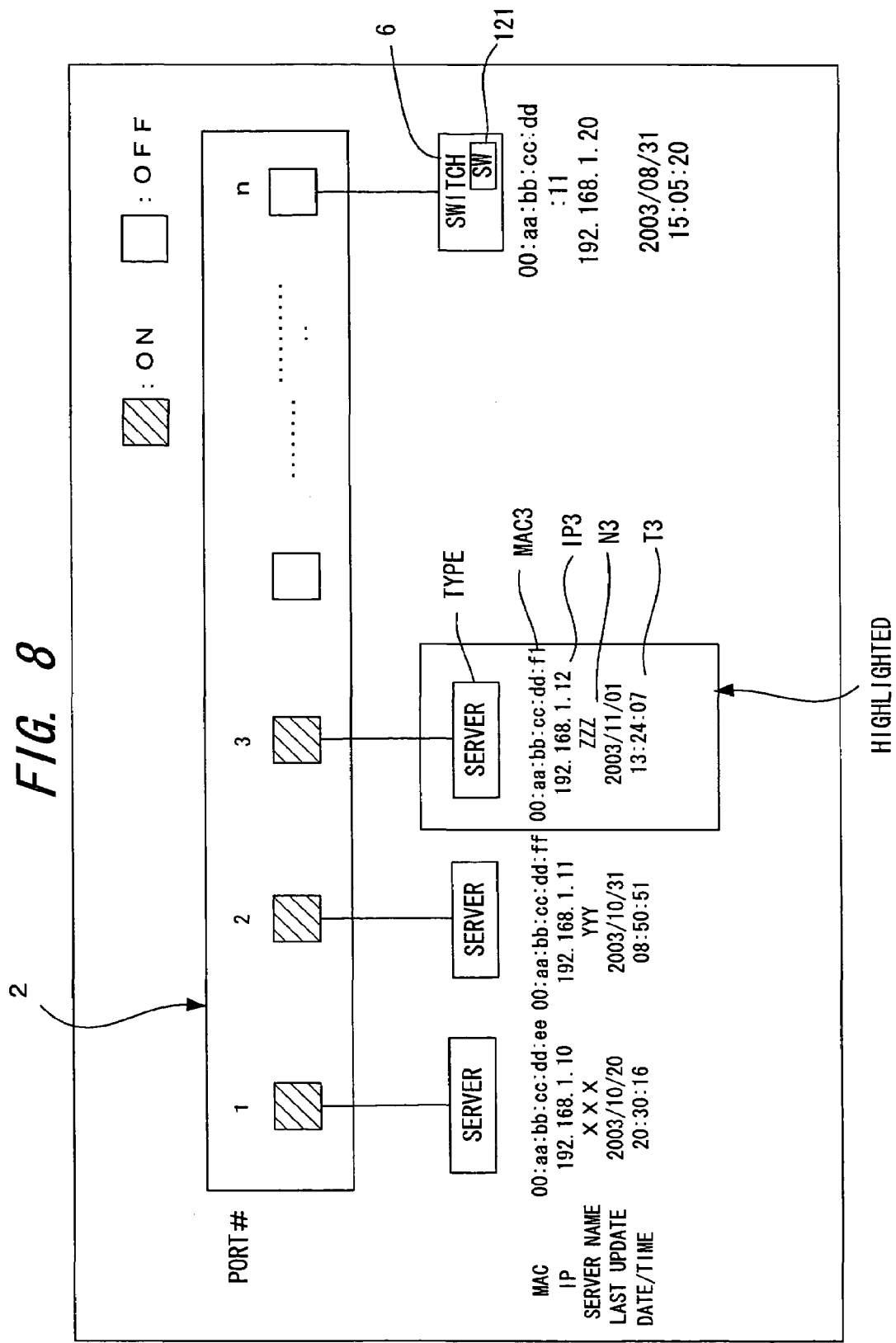
FIG. 8 is an explanatory diagram showing a configuration information display example.

When the server S3 is newly added as illustrated in FIG. 6, the above processing causes the display 11 of the management server 1 to display configuration information as the one shown in FIG. 8.

Figure 7:
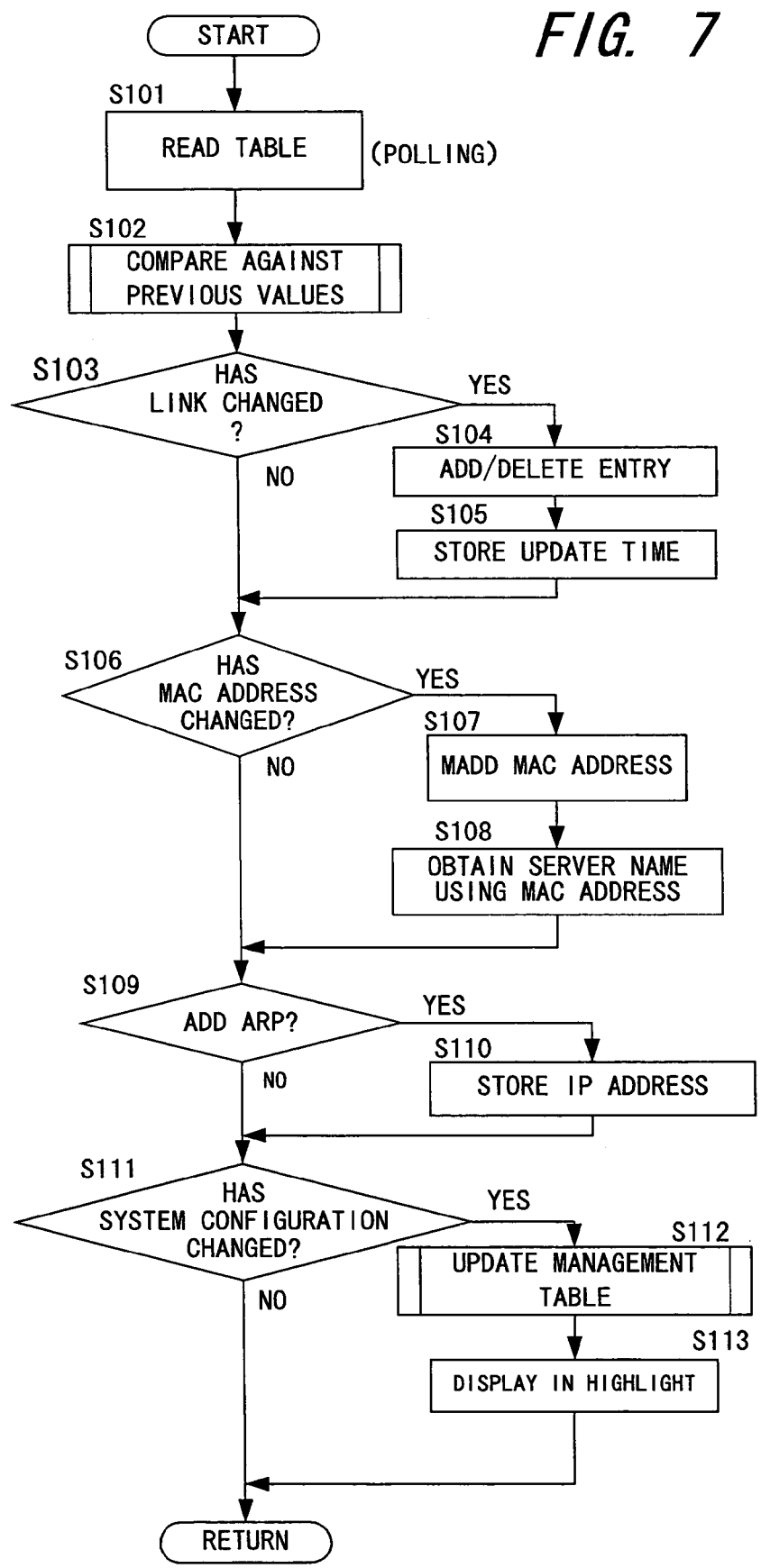
FIG. 7 is a flow chart showing an example of processing executed by the management server.

FIG. 8 shows an example of configuration information displayed on the display 11 of the management server 1 for when the server S3 is added to the network switch 2 through the processing of FIGS. 6 and 7.

In FIG. 8, the state of the ports P1 to Pn of the network switch 2 is shown by a hatched square and a blank square. A hatched square represents a port to which a device is connected while a blank square represents a port to which no device is connected. A number displayed above each square represents a port number.

Displayed below a port to which a device is connected is configuration information of the device.

Of the configuration information displayed, TYPE which indicates the type of the device is put inside a square frame while the MAC address, the IP address, the device name, and the date and time of update are placed under the frame.

For a while immediately after the server S3 is added, the configuration information displayed is framed and highlighted as shown in FIG. 8, thereby drawing attention to the device where a change has occurred and clearly signaling the administrator about the system having had change. The device type TYPE may be retrieved from the device management table 13 of the management server 1 by storing MAC addresses and device types in advance and by searching the table with the MAC address, or may be inputted by the administrator.

When the device type TYPE is switch, a button 121 is provided inside the frame as for the network switch 6 shown in FIG. 8 and is checked by the mouse or the like to switch over to a configuration information screen similar to the network switch 2.

Figure 9:
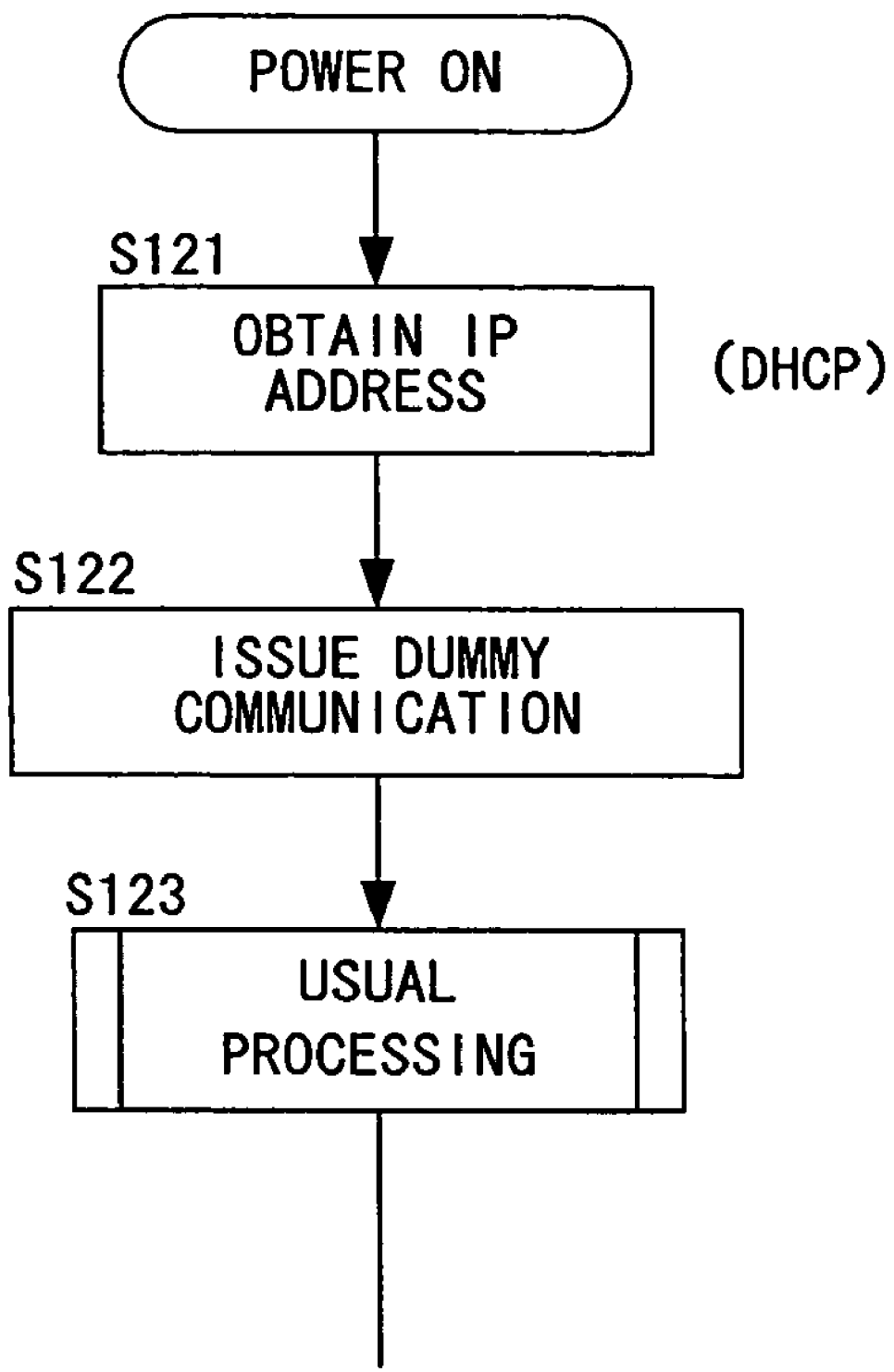
FIG. 9 is a flow chart showing an example of processing executed by the server S3.

FIG. 9 is a flow chart showing processing executed by the added server S3 upon startup.

Immediately after connected to the network switch 2 and booted up, the server S3 makes an ARP request and conducts a dummy communication with a device at a given address (for example, a preset default gateway) in order to cause the network switch 2 to obtain the MAC address and the IP address.

First, in a step S121, an IP address is requested from the DHCP server 3. Once the IP address is obtained, the processing proceeds to a step S122 to start a dummy communication with the default gateway. The dummy communication is achieved, as shown in the step S508 of FIG. 6, by broadcasting an ARP request packet within the sub-net, and enables the network switch 2 to obtain the MAC address and IP address of the newly added server S3 instantly.

In a step S123, the server 3 then executes usual processing (for example, startup of an application).

As has been described, according to the first embodiment of this invention, the management server 1 which manages a number of servers and network devices in a data center or the like executes polling on the network switch 2, which is a subject to be managed, making it possible to automatically detect addition of a new device or removal of an existing device for each of the ports P1 to Pn, and to manage devices with the MAC address (layer 2 identifier), which is a globally unique identifier, and an IP address (layer 3 identifier) unique throughout the intra network. Therefore the physical location and logical position of a device can be specified automatically and accurately.

With the MAC address, IP address, and device name of a device that is located at a port of the network switch 2 displayed on the display 11 of the management server 1 to the administrator for a visual check, the administrator can quickly and readily grasp the physical connection location of a device where a change has occurred and the device's logical position in the network. The administrator is thus freed from the hassle of manually checking the added or removed device unlike prior art. As a result, work steps accompanying a device change are greatly reduced in number and the efficiency of system management is improved considerably.

Whether the added device is correct or not can easily be judged by the MAC address which is an identifier unique to a device. Furthermore, whether the IP address set to the added device is correct or not can also be judged with ease by comparison of the MAC address and the IP address.

For instance, in the case where the network switch 2 groups VLANs (Virtual LANs) by port locations and accordingly the port location of a device added matters, the management server 1 can obtain, immediately after a device is added, the port location and the MAC address or the IP address and can quickly judge whether the physical location and logical position of the added device are correct. The management server 1 of this invention is thus very effective in an application where VLANs are grouped by port locations of the network switch 2.

Moreover, since the connection location of a device and details of individual devices are recognized, human error in adding a device, changing a connection, and the like can be pointed out promptly with precision, and the efficiency of maintenance work in the data center can be markedly improved.

The servers S1 through S3 constituting the system conduct a dummy communication immediately after being booted up. This enables the network switch 2 to quickly obtain the MAC address and IP address of a new device from an ARP request packet, thereby shortening the time it takes for the management server 1 to recognize the device since addition of the device to the system and making instant comprehension of a change in system configuration possible.

Examples of dummy communication startup methods are shown below.

(1) Methods to conduct a dummy communication upon booting up the server (1-1) A method of starting up a dummy communication by BIOS, EFI (Extensible Firmware Interface), or other programs that operate before boot-up of the OS (1-2) A method of starting up a dummy communication by a boot-up script (rc or the like) of the OS (1-3) A method of conducting a dummy communication by an agent program which is activated after boot-up (2) Methods to start up a dummy communication at regular intervals (2-1) A method of starting up a dummy communication at regular intervals (for example, once a minute) by an agent program on a server Furthermore, displaying devices that are connected to the network switch 2 which is a subject to be managed and highlighting or otherwise enhancing a newly added device as shown in FIG. 8 enable the administrator to easily recognize the port location and device where a change has occurred and thus improve the system management response.

The management server 1 executes polling on the network switch 2 which is a subject to be managed. Compared to scanning the entire network as in prior art, this embodiment can reduce traffics in the network considerably and can obtain device configuration information without weighing down the network bandwidth.

Figure 10:
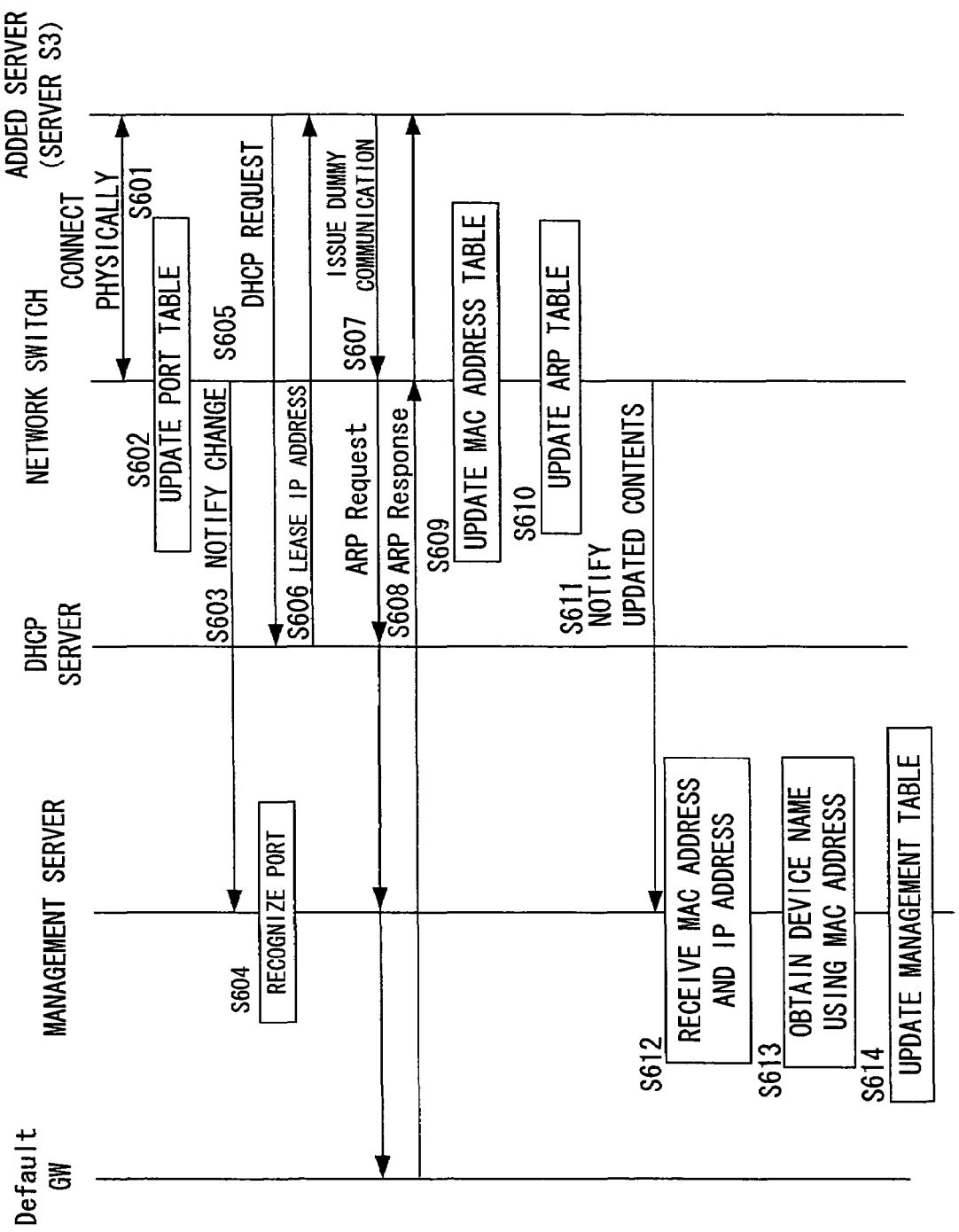
FIG. 10 is a sequence diagram for communications between a management server, a network switch, a server to be added, and a default gateway that is set to the server S3 in advance according to a second embodiment of this invention.
Figure 11:
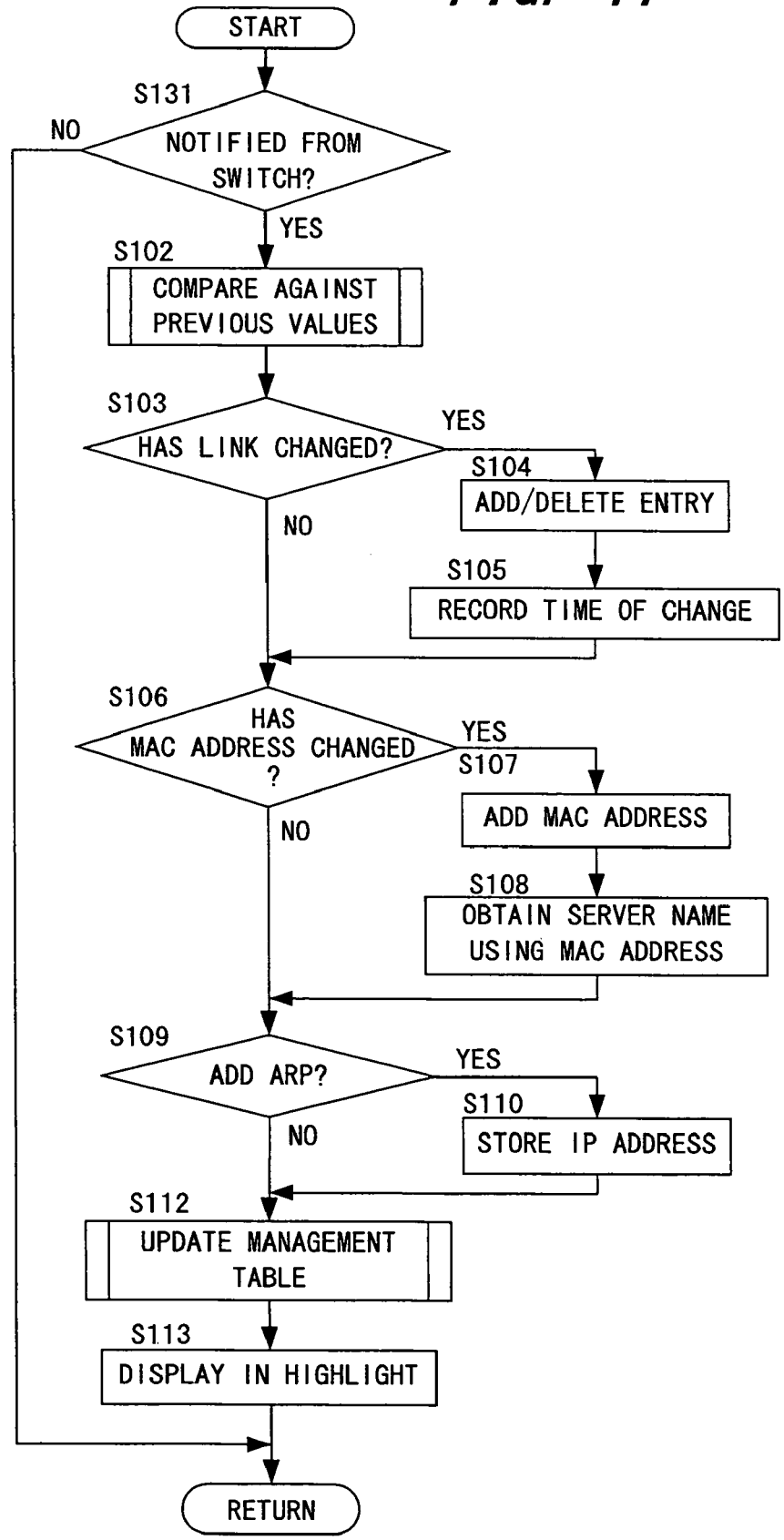
FIG. 11 is a flow chart showing an example of processing executed by the management server.

FIGS. 10 and 11 show a second embodiment of this invention in which the polling by the management server 1 of the first embodiment is replaced with notification of a change in the ports P1 to Pn to the management server 1 by the network switch 2. The rest of the configuration of the second embodiment is the same as the first embodiment.

FIG. 10 is a sequence diagram for communications between the management server 1, the network switch 2, the server S3 to be added, and a default gateway (for example, the load balancer 4) set to the server S3 in advance for when the server S3 is added at the port P3 of the network switch 2 shown in FIG. 1.

The network switch 2 has a control unit and a storage system (RAM or the like) (not shown). The control unit includes monitoring module which monitors the ports P1 to Pn to update the port table 21, the MAC address table 22, and the ARP table 23, and notifying module which notifies the management server 1 of a change in the ports P1 to Pn. The storage system stores the port table 21, the MAC address table 22, and the ARP table 23 as in the first embodiment.

First, the server S3 is physically connected to the port P3 of the network switch 2 (a step S601). Upon addition of the server S3, the network switch 2 which monitors the ports P1 to Pn updates the state field in the port table 21 that corresponds to the port number 3 from OFF to ON (a step S602).

The network switch 2 notifies the management server 1 of the change in state of the port P3.

Receiving the notification, the management server 1 recognizes addition of a new device at the port P3 of the network switch 2 from the fact that the state of the port number 3 of the network switch 2 has changed from OFF to ON (a step S604). As the new port is recognized, the management server 1 adds an entry for the port P3 to the management table 12 shown in FIG. 5A.

The newly added server S3 requests an IP address from the DHCP server 3 (a step S605). The DHCP server 3 sends in response a given IP address (IP3) to the server S3, which sets the received IP address IP3 as its own IP address (a step S606).

Obtaining the IP address, the added server S3 issues a dummy communication to the given default gateway (load balancer 4) through processing described in the first embodiment with reference to FIG. 7 (a step S607). Since the server 3 is yet to obtain the MAC address of the default gateway (load balancer 4) at this point, the server S3 broadcasts an ARP request within the sub-net.

The default gateway sends an ARP in response to the ARP request to notify the server S3 of the MAC address of the default gateway (a step S608).

From a packet of the dummy communication by the server S3 in the step S608, the network switch 2 which monitors the ports P1 to Pn extracts the MAC address and IP address of the server S3, adds the MAC address of the server S3, namely, MAC3, to the MAC address table, and adds the IP address of the server S3 that is associated with the MAC address MAC3, namely IP3, to the ARP table 23 (steps S609 and S610).

The network switch 2 notifies the management server 1 that the MAC address and IP address of the server S3 connected to the port P3 are obtained (a step S611).

The management server 1 receives the MAC address and the IP address (a step S612), and searches the device management table 13 to obtain the device name that is associated with the new MAC address MAC3 (a step S613).

The management server 1 adds the MAC address MAC3, the IP address IP3, and the obtained device name to the entry for the port P3 that has been created in the management table 12, and keeps configuration information of the newly added server S3 (a step S614).

Thus notified by the network switch 2 of the number of a port where a change has occurred along with the MAC address and IP address of the device connected to the port each time there is a change in state of the ports P1 to Pn, the management server 1 can detect a change in a device of the intra network and automatically update the management table 12 without conducting the polling of the first embodiment. This enables the management server 1 to recognize the physical location of a new device and identify the device with the use of existing port numbers of the network switch 2 and the MAC address which is a globally unique identifier, and to locate the logical position of the added device on the network with the use of the IP address set to the added device.

FIG. 11 is a flow chart showing the processing contents of the management server 1 which have been described with reference to FIG. 10.

This flow chart is a modification of the flow chart shown in FIG. 7 in accordance with the first embodiment, and has a step S131, in which whether a notification from the network switch 2 is received or not is judged, in place of the step S101 for the polling processing. The rest of the configuration of FIG. 11 is the same as FIG. 7, except that the step S111 of FIG. 7 is unnecessary in FIG. 11 and accordingly is eliminated.

Receiving a notification from the management server 1 (the step S131), the management server 1 compares the contents of the current management table 12 against the contents of the notification and executes the step S103 and the subsequent processing.

When the network switch 2 notifies that there is a change in port state (the step S603 of FIG. 10), an entry is added or deleted in the management table 12 and the time when the change has occurred is stored in the step S103 through S105.

As a MAC address and an IP address are notified from the network switch 2 (the step S611), the MAC address is added to the entry of the management table 12 and a device name that is associated with the MAC address is obtained (the steps S106 through S108). The IP address, the device name, and the update time are added to this entry and then displayed on the display 11 (the steps S112 and S113).

With the polling processing eliminated, the management server 1 can reduce traffics in the network even more than in the first embodiment.

Figure 12:
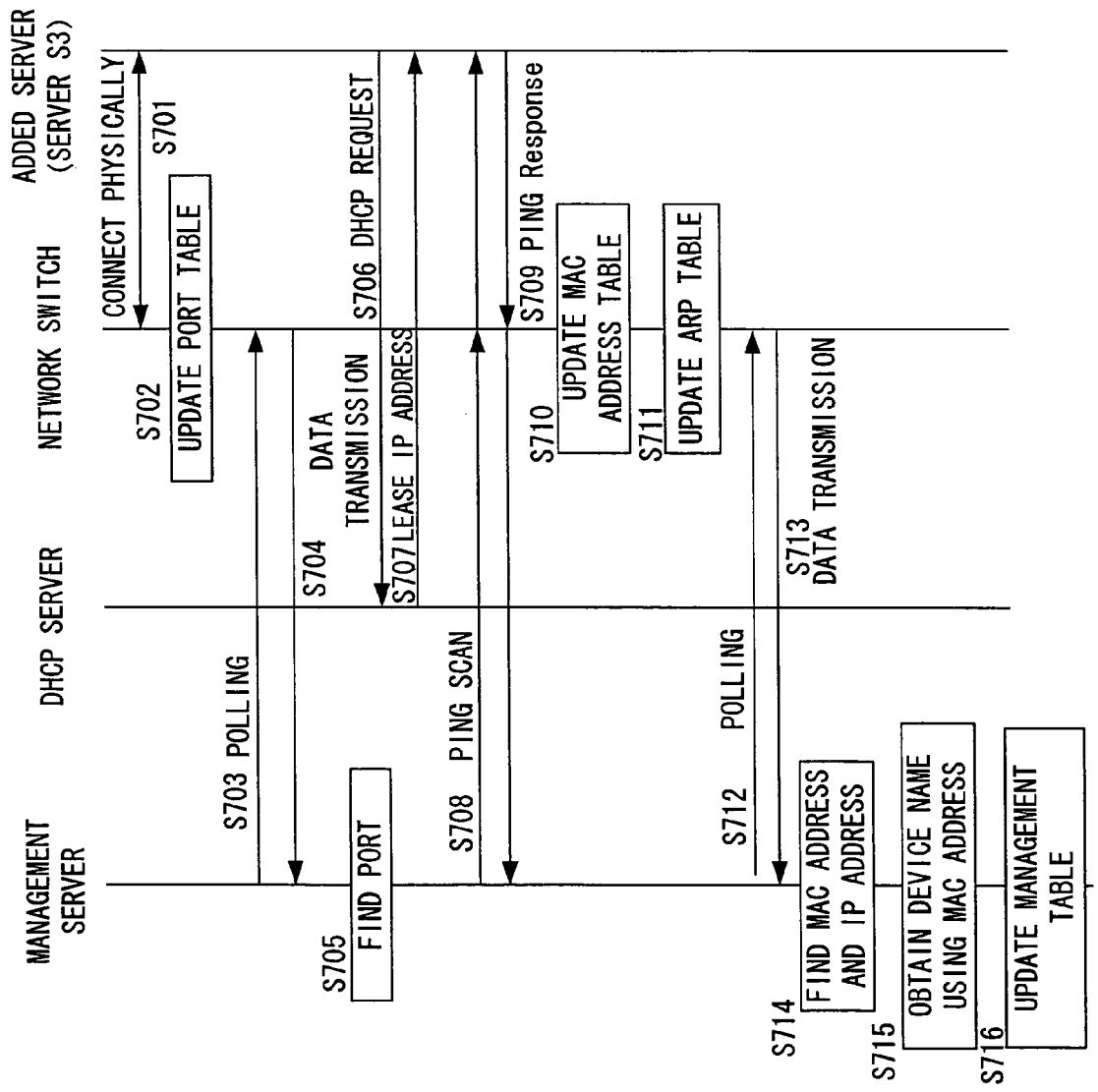
FIG. 12 is a sequence diagram for communications between a management server, a network switch, and a server to be added according to a third embodiment of this invention.
Figure 13:
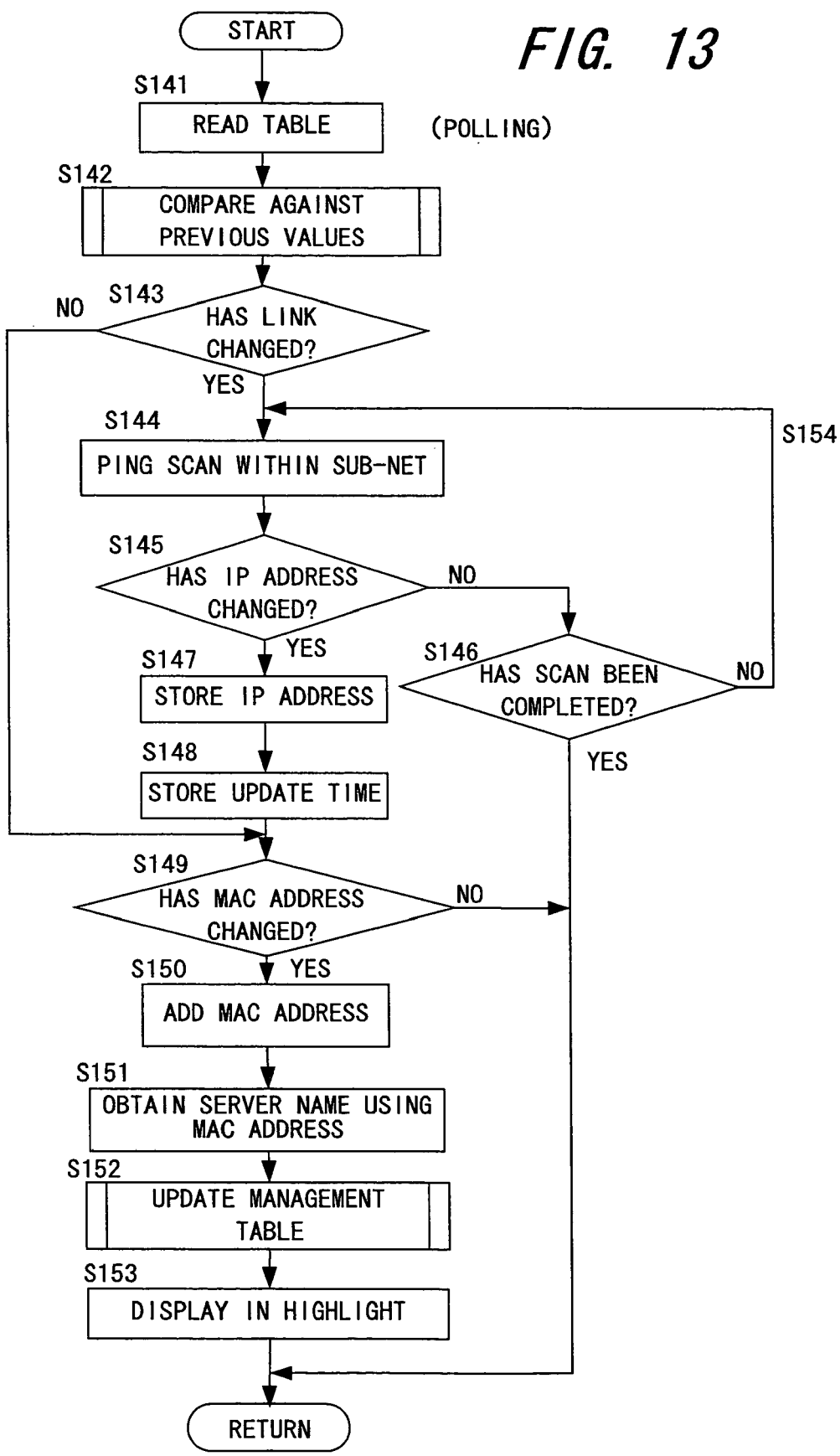
FIG. 13 is a flow chart showing an example of processing executed by the management server.

FIGS. 12 and 13 show a third embodiment of this invention in which the management server 1 executes a PING (Packet Internet Groper) scan within the sub-net to which the network switch 2 belongs instead of having the network switch 2 obtain the MAC address and IP address of the server S3 through a dummy communication of the server S3 as in the first embodiment. The rest of the configuration of the third embodiment is the same as the first embodiment.

FIG. 12 is a sequence diagram for communications between the management server 1, the network switch 2, and the server S3 to be added for when the server S3 is added at the port P3 of the network switch 2 shown in FIG. 1.

First, the server S3 is physically connected to the port P3 of the network switch 2 (a step S701). Upon addition of the server S3, the network switch 2 which monitors the ports P1 to Pn updates the state field in the port table 21 that corresponds to the port number 3 from OFF to ON (a step S702).

The management server 1 executes polling at a given cycle (e.g., for every few seconds) (a step S703) and obtains values of the tables 21 to 23 shown in FIGS. 2 to 4 from the network switch 2 (a step S704).

The management server 1 finds out addition of a new device connected to the port P3 of the network switch 2 from the fact that the state field in the port table 21 of the network switch 2 that corresponds to the port number 3 has been changed from OFF to ON (a step S705). As the new port is found, the management server 1 adds an entry for the port P3 to the management table 12.

The newly added server S3 requests an IP address from the DHCP server 3 (a step S706). The DHCP server 3 sends in response a given IP address (IP3) to the server S3, which sets the received IP address IP3 as its own IP address (a step S707).

Next, the management server 1 executes a PING scan for each IP address in the sub-net to which the network switch 2 belongs (own sub-net) in order to make the network switch 2 recognize the MAC address and IP address of the added server S3 (a step S708).

The added server S3 responds to PING of the management server 1 (a step S709). Using the PING response, the network switch 2 extracts the MAC address and IP address of the added server S3, adds the MAC address of the server S3, namely, MAC3, to the MAC address table, and adds the IP address of the server S3 that is associated with the MAC address MAC3, namely IP3, to the ARP table 23 (steps S710 and S711).

The management server 1 executes polling on the network switch 2 at a given cycle (a step S712), and obtains the values of the tables 21 to 23 (a step S713). Then the management server 1 compares the obtained values against the management table 12 to find, in new entries of the MAC address table 22 and the ARP table 23, as a new device, MAC3 and IP3 corresponding to the server S3 (a step S714).

The management server 1 searches the device management table 13 to retrieve a device name that is associated with the new MAC address MAC3 (a step S715).

The management server 1 adds the MAC address MAC3, the IP address IP3, and the obtained device name to the entry for the port P3 that has been created in the management table 12, creates configuration information of the newly added server S3, and updates the management table (a step S716).

As has been described, the management server 1 executes periodical polling on the network switch 2 and, when there is a change in state of a port of the network switch 2, executes a PING scan to make the network switch 2 recognize the MAC address and IP address of the new device, and then obtains from the network switch 2 the MAC address and IP address of the added device. The management server 1 thus can quickly detect a change in a device of the intra network and automatically update the management table 12. This enables the management server 1 to recognize the physical location of a new device and identify the device with the use of existing port numbers of the network switch 2 and the MAC address which is a globally unique identifier, and to locate the logical position of the added device on the network with the use of the IP address set to the added device.

The processing by the management server 1 which is shown in FIG. 12 will be described next with reference to a flow chart of FIG. 13.

First, in a step S141, polling is performed on the network switch 2, which is a network device to be managed, and a transmission request is made to the tables 21 to 23 to receive the values of the tables 21 to 23 from the network switch 2 (the steps S703 and S704 of FIG. 12).

In a step S142, the current management table 12 which holds the previous values is compared against the values in the tables 21 to 23.

In a step S143, the comparison results are used to judge whether there is a change in link state of the ports P1 to Pn of the network switch 2 or not. In the case where the ON/OFF state has been changed for any of the ports P1 to Pn, it is judged that the link state has been changed and the procedure proceeds to a step S144 to add or delete the entry for the corresponding port number. The link state is judged as changed when ON is set for a port number that is not listed in the current management table 12 and when no MAC address or IP address is stored in association with the port number added to the management table 12. On the other hand, in the case where there is no change in link state, the procedure proceeds to a step S149, where a MAC address change is checked.

When there is a change in link state, a PING scan is executed in the sub-net to which the network switch 2 belongs through a loop of steps S144, S145, and S145. The PING scan is executed sequentially from 1 to 254 of the sub-net, for example.

In the step S145, the IP address in the PING response is compared against the IP address in the management table 12 to judge whether there is a new IP address or not. When a new IP address is found, the processing proceeds to a step S147 and, when there is no new IP address, the processing proceeds to a step 146 where it is judged whether the last destination IP address has been reached or not. When this IP address has been reached, the processing ends and, otherwise, the processing returns to the step S144 to continue the PING scan.

In the step S147, the new IP address is stored. In a step S148, the current time is stored as update time.

In the step S149, the table values of the network switch 2 which have been read in the step S141 are compared against the current management table 12 to judge whether there is a new MAC address or not. When there is a new MAC address, the processing proceeds to a step S150. When there is no new MAC address, on the other hand, the processing ends at this point.

In the step S150, the new MAC address is added to the entry which corresponds to the port number and which has been added in the step S143. In a step S151, a device name associated with the new MAC address is obtained (the step S715 of FIG. 12).

In a step S152, the IP address stored in the step S147, the update time stored in the step S148, and the device name obtained in the step S151 are added to the management table 12 to which the MAC address has been added in the step S150.

In a step S153, the contents of the management table 12 are displayed on the display 11, where configuration information for the newly added or deleted port number is highlighted.

The above processing is repeatedly executed at a given cycle to find, when a change in state of a port of the network switch 2 is detected through the polling processing, a new IP address through a PING scan and the network switch 2 extracts the new IP address and MAC address from the PING response.

The management server 1 reads a new MAC address through the next round of polling processing and records configuration information on the newly added server S3 in the management table 12. To be more specific, the port number, the IP address, and the modification time are obtained in the first polling processing while the MAC address and the device name are obtained in the next polling processing.

Having no need for dummy communication processing of the servers S1 through S3 unlike the first embodiment, the third embodiment is advantageous in that a new device can quickly be added to the system.

In the PING scan described above, PING for existing IP addresses listed in the management table 12 can be omitted and accordingly traffics in the sub-net are reduced.

FIGS. 14 to 22 show a fourth embodiment of this invention in which the network switch 2 of the first embodiment is modified to control communications for VLANs separately by setting VLANs in accordance with an instruction from the management server 1, and in which the load balancer 4 of the first embodiment is modified to adjust the load of VLANs separately. The rest of the configuration of the fourth embodiment is the same as the first embodiment.

Figure 14:
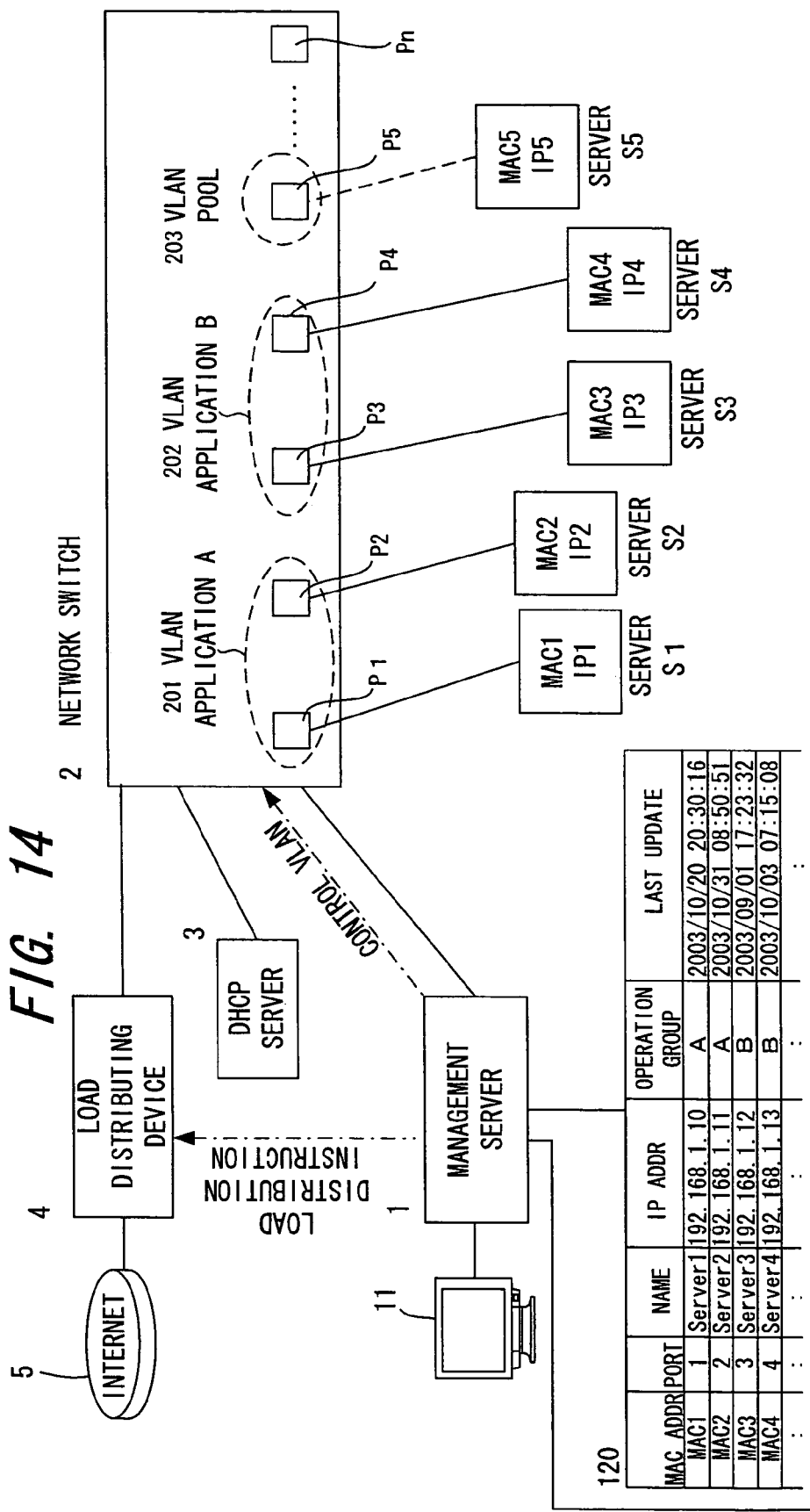
FIG. 14 is a system diagram showing the configuration of a data center according to a fourth embodiment of this invention.

FIG. 14 shows an example of the data center configuration. In FIG. 14, three VLANs are set to the network switch 2 based on an instruction from the management server 1, and the servers S1 through S4 are connected to respective VLAN groups. The description given here takes as an example the case in which a VLAN is controlled on the MAC address basis.

The load balancer 4 which serves as a gateway adjusts the load of VLAN groups separately in accordance with an instruction from the management server 1.

The network switch 2 controls a VLAN 201 composed of the servers S1 and S2, which execute an application A, a VLAN 202 composed of the servers S3 and S4, which perform an application B, and a pool VLAN 203 to put aside a server that is not assigned to any application.

The servers S1 through S4 are connected to the ports P1 to P4 of the network switch 2, respectively. The MAC addresses MAC1 and MAC2 of the servers S1 and S2 are allocated to the VLAN 201 for the application A while the MAC addresses MAC3 and MAC4 of the servers S3 and S4 are allocated to the VLAN 202 for the operation B. The server S5 in FIG. 14 is not connected to the network switch 2.

As in the first embodiment, the management server 1 has a management table 120 which manages the MAC address and the IP address for each port of the network switch 2. The management table 120 has, as shown in FIG. 15, VLAN groups G1 and G2 in addition to the items of the management table of the first embodiment which is shown in FIG. 5.

The management server 1 has the device management table 13 as in the first embodiment.

The management server 1 monitors, through polling processing, a device connected to the network switch 2 as in the first embodiment and, in addition, when a new device is found, adds the device found to the pool VLAN 203 first and then to other VLANs following an instruction from the administrator or operator.

Figure 16:
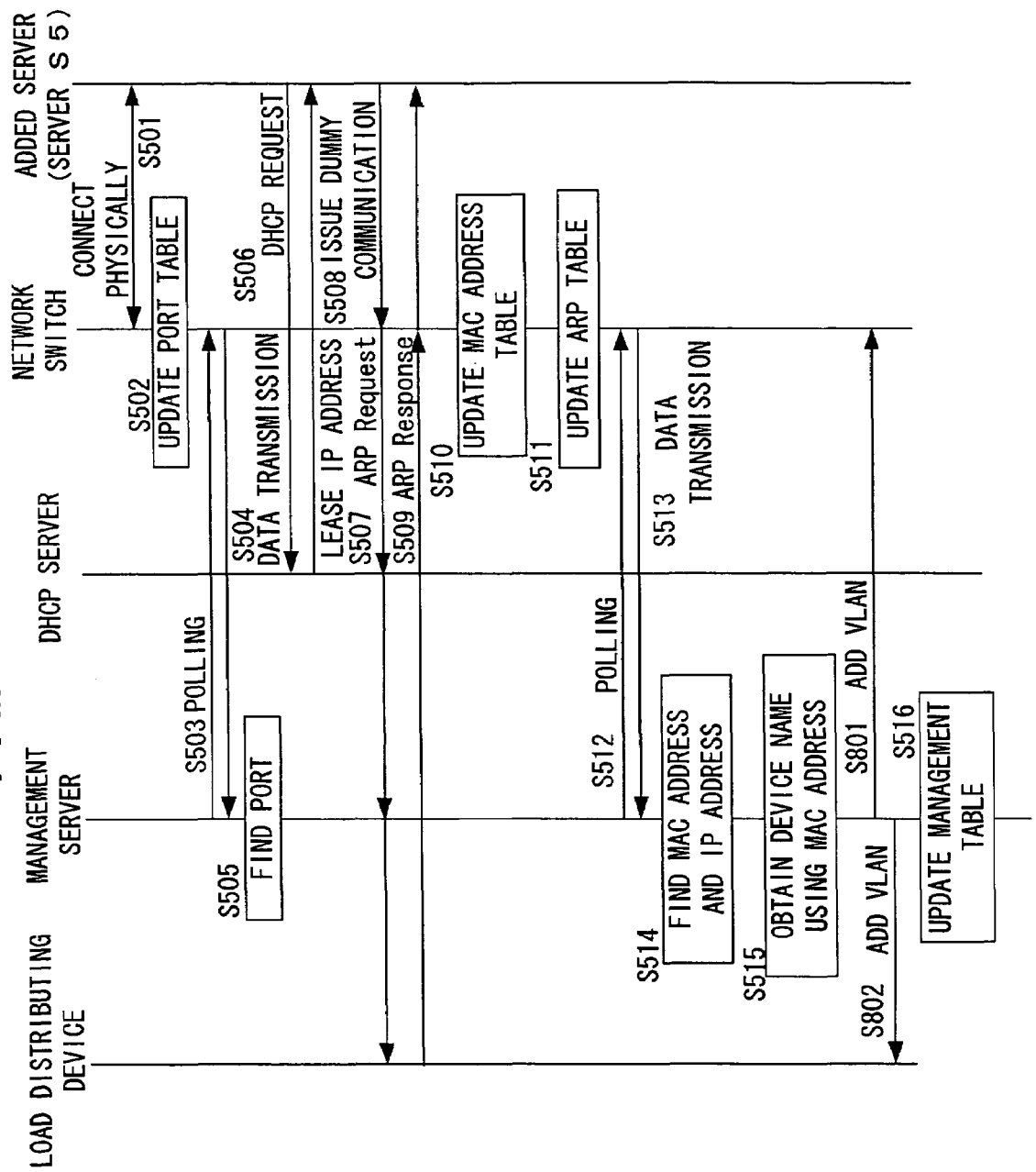
FIG. 16 is a sequence diagram for communications between a management server, a network switch, a server to be added, and a load balancer.

FIG. 16 is a sequence diagram for communications among the management server 1, the network switch 2, the server S5 to be added, and the load balancer 4 for when the server S5 is added to the system in FIG. 15 and connected to the port P5.

Steps S501 through S507 of FIG. 16 are the same as the steps S501 through S507 of FIG. 6 described in the first embodiment. When the port P5 to which a new device is connected is found, an entry for the port number 5 is added to the management table 120, and the MAC address (MAC5), IP address (IP5), and device name of the new device are obtained in a manner similar to the first embodiment (the steps S501 through S515).

Thereafter, the management server 1 instructs the network switch 2 to add the MAC address (MAC5) of the new device to the pool VLAN 203 (a step S801). The server S5 is thus added to the pool VLAN 203. Similarly, the load balancer 4 too is notified of the addition of the server S5 to the pool VLAN 203 (a step S802).

The obtained MAC address, IP address, and device name are added to the added entry of the management table 120 to create new configuration information.

As has been described, the management server 1 automatically adds a new device to the pool VLAN 203 in preparation of adding the new device to other VLANs.

Figure 17:
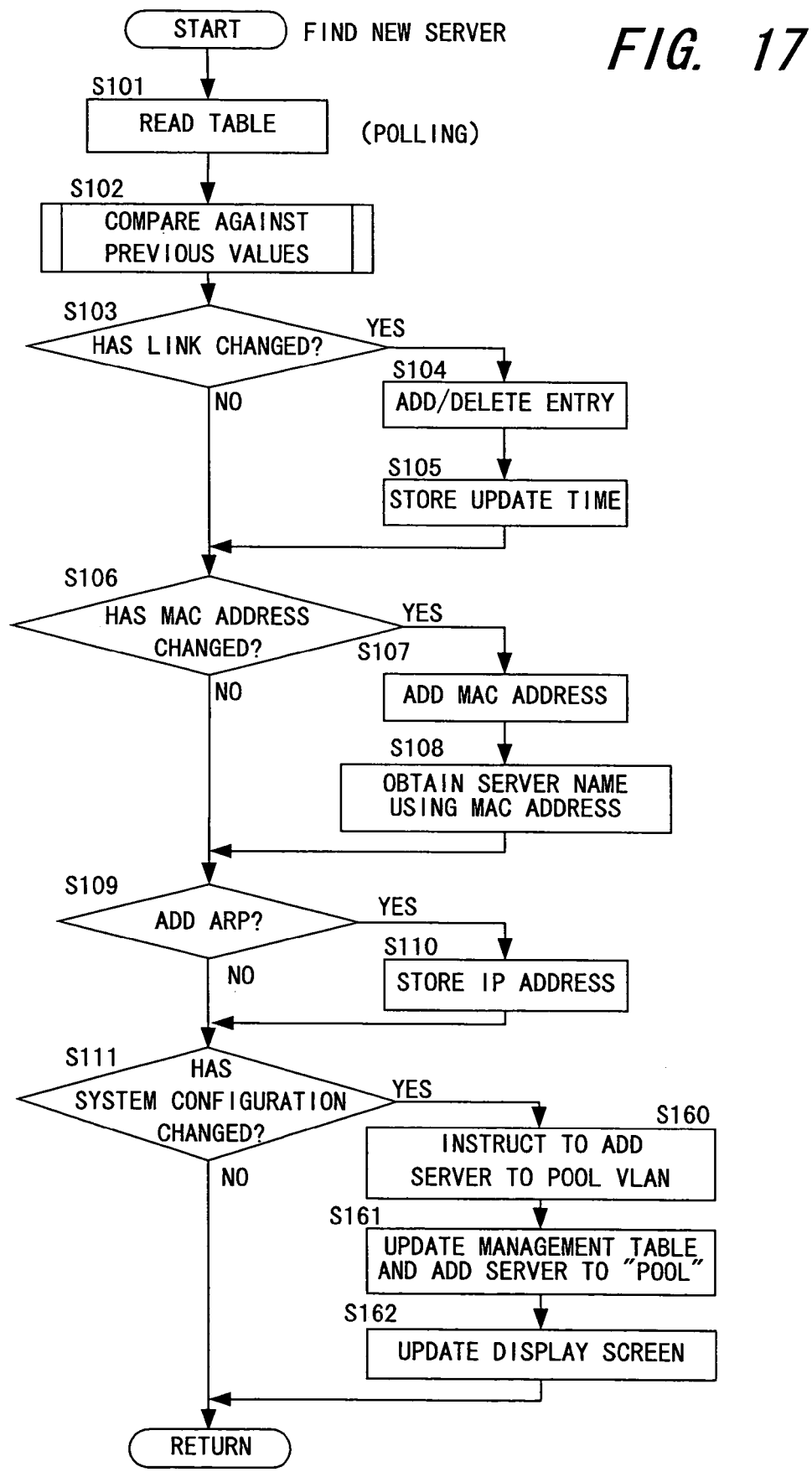
FIG. 17 is a flow chart showing an example of processing executed by the management server.

The processing by the management server 1 which is shown in FIG. 16 will be described with reference to a flow chart of FIG. 17. In the flow chart of FIG. 17, steps S101 through S111 are the same as the steps S101 through S111 of FIG. 7 described in the first embodiment; when a new device (the server S5) is found, an entry is added to the management table 120 and the MAC address, IP address, and device name of the added device are obtained.

In the case where a system configuration change is found in the step S111, the management server 1 instructs the network switch 2 to add the new server S5 to the pool VLAN 203 in a step S160. The management server 1 then notifies the load balancer 4 of the addition of the server S5 to the pool VLAN 203 to adjust the load for the VLAN groups separately (a step S161).

The obtained MAC address, IP address, device name, update time, and VLAN group are added to the added entry to update the management table 120 (the step S161). The devices are grouped into the VLAN groups and displayed on the display 11 of the management server 1 as shown in FIG. 18 (a step S162).

Figure 18:
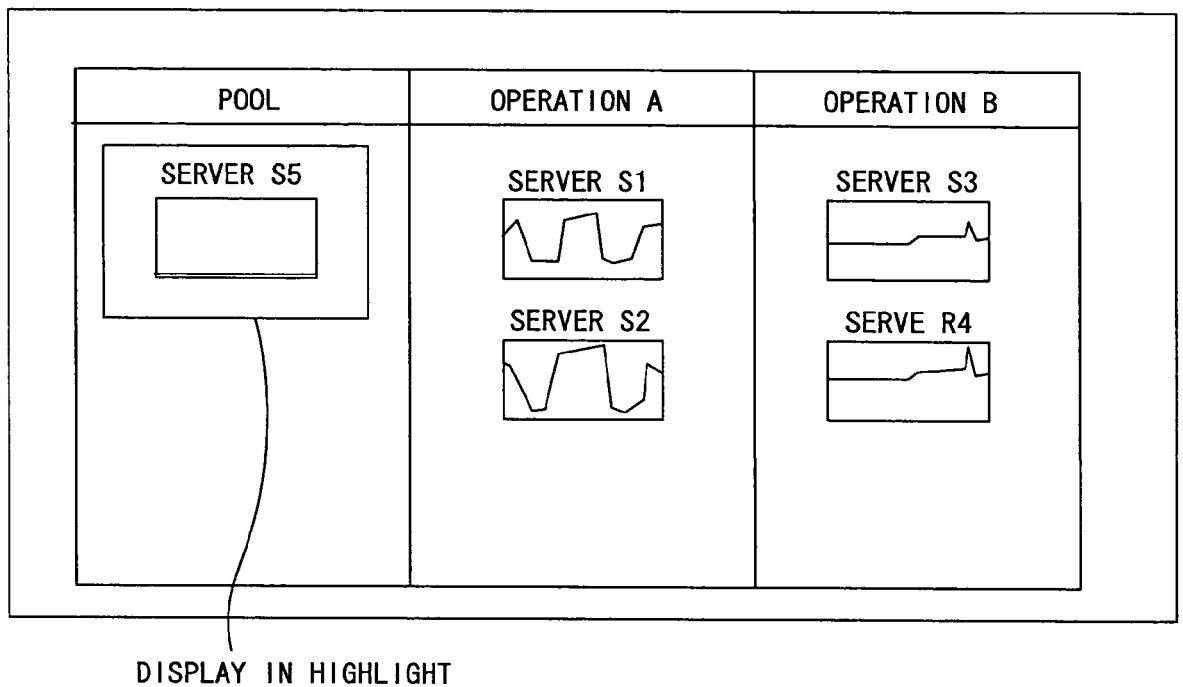
FIG. 18 is an explanatory diagram showing a display example of a display on which devices grouped into VLAN groups are displayed.

FIG. 18 is a display example of the display 11 on which devices grouped into VLAN groups are displayed.

The display 11 displays graphs which show time-series changes of the load factor of the servers S1 through S5 while dividing the servers into the VLAN groups for pool, the application A, and the application B.

In FIG. 18, a symbol representing the server S5 newly added to the pool VLAN is highlighted in a frame to draw attention to the device change. Alternatively, configuration information may be displayed in association with the ports of the network switch 2 as shown in FIG. 8 in the first embodiment. It is also possible to switch between the VLAN group-basis display screen and the port-basis display screen.

Through the above processing, configuration information of a new device is collected as in the first embodiment and the added device is put in the stand-by VLAN group (pool VLAN group). This facilitates maintenance of a system that has a VLAN.

The graphs showing time-series changes of the load factor serve as symbols representing devices of the VLAN groups. This enables the administrator to intuitively know to which group a new server is to be added or which group has a server that can be removed and to make a judgment concerning management quickly.

Described next is a case in which the server S5 of the pool VLAN 203 is moved to other VLAN groups.

Figure 19:
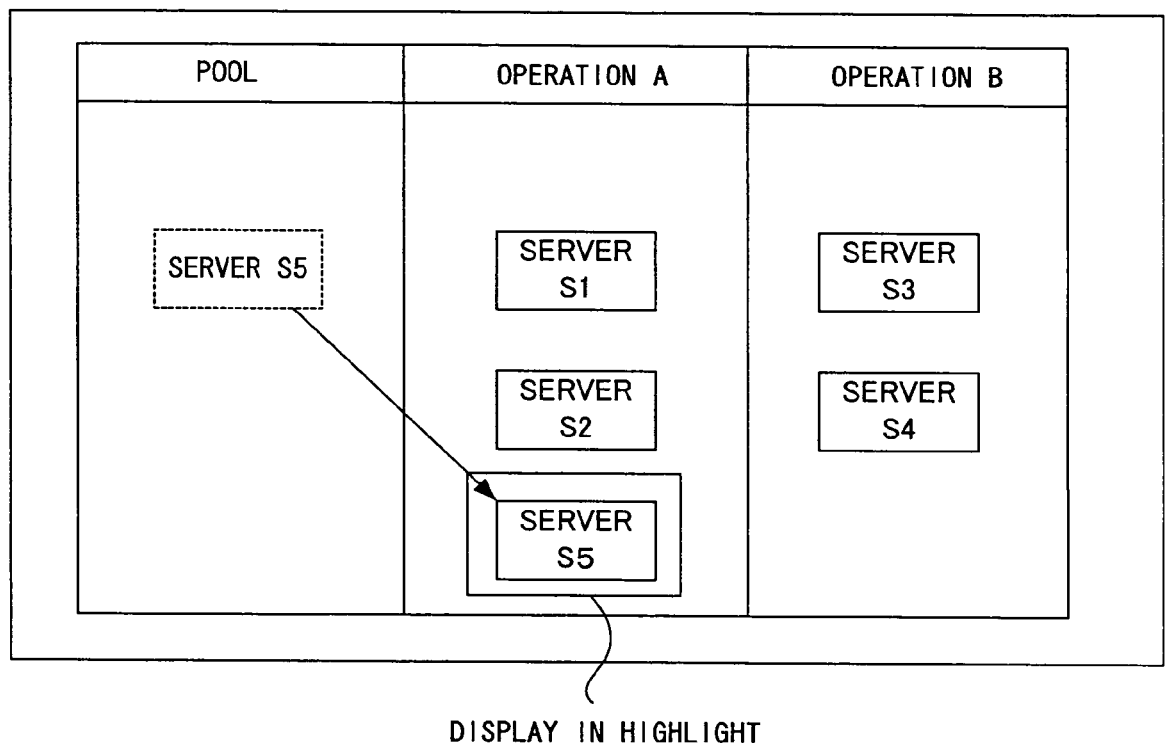
FIG. 19 is an explanatory diagram showing another display example in which a VLAN group of a server S5 is moved from a pool to an operation A.

FIG. 19 shows a display example of the display 11 on which devices grouped into VLAN groups are displayed. In FIG. 19, the added server S5 is moved from the pool VLAN 203 to the VLAN 201 for the application A.

The mouse (not shown) or the like of the management server 1 is manipulated to move the symbol representing the server S5 (load factor graph) from the pool group to the group for the application A.

Figure 20:
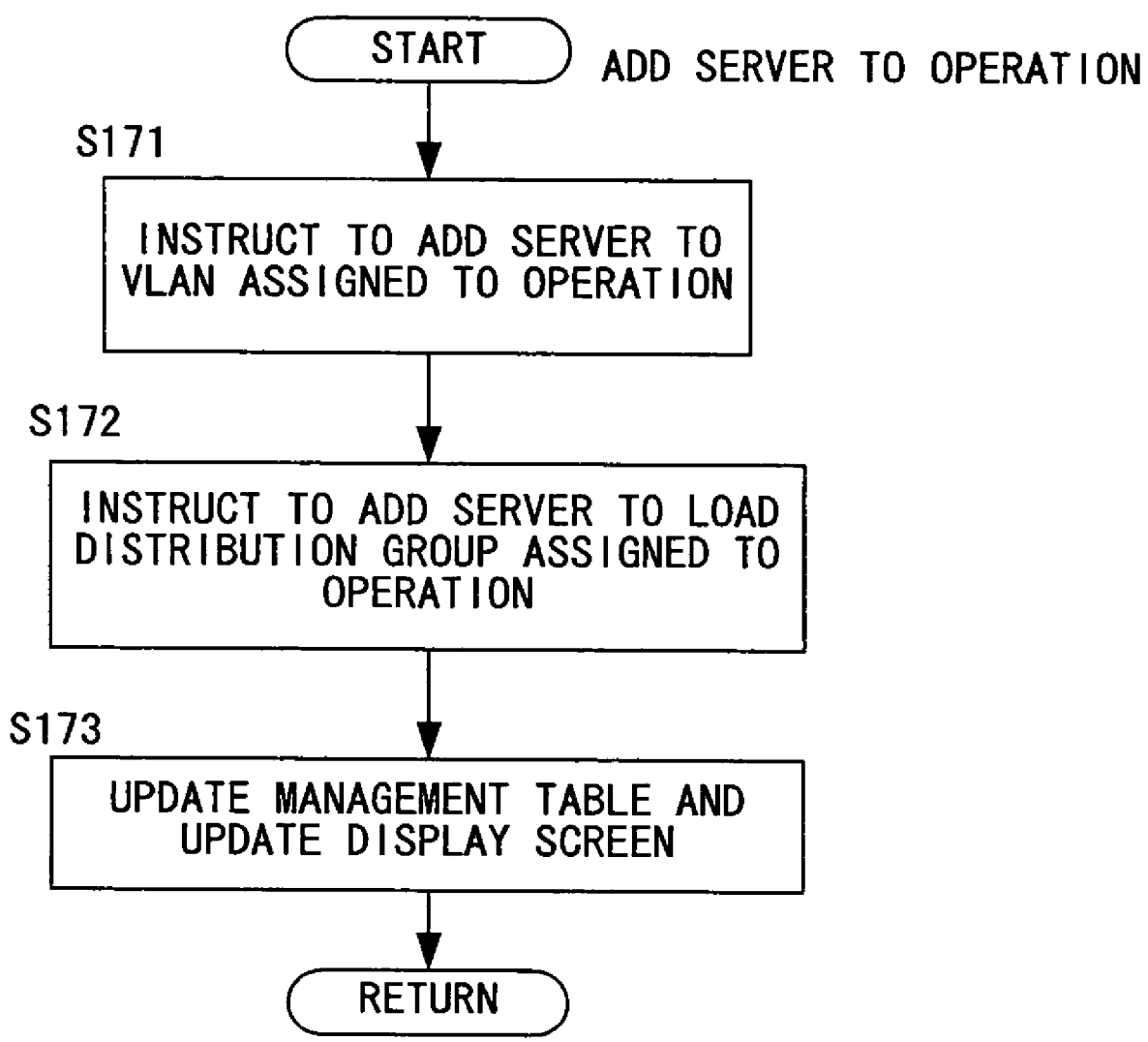
FIG. 20 is a flow chart showing an example of processing executed by the management server.

With the manipulation of the mouse or the like, the management server 1 instructs the network switch 2 to reallocate the MAC address of the server S5 to the VLAN 201 for the application A as shown in a flow chart of FIG. 20 (a step S171). The management server 1 notifies the load balancer 4 of the transfer of the server S5 from the pool VLAN 203 to the application A VLAN 201 to change groups of load balancing (step S172 to S173).

Then the VLAN group of the server S5 in the management table 120 is changed from pool to application A to highlight the symbol of the server S5 moved as shown in a frame in FIG. 19. Then, the processing ends.

Described next is the case of moving the server S2 of the VLAN 201 for the application A to other VLAN groups.

Figure 21:
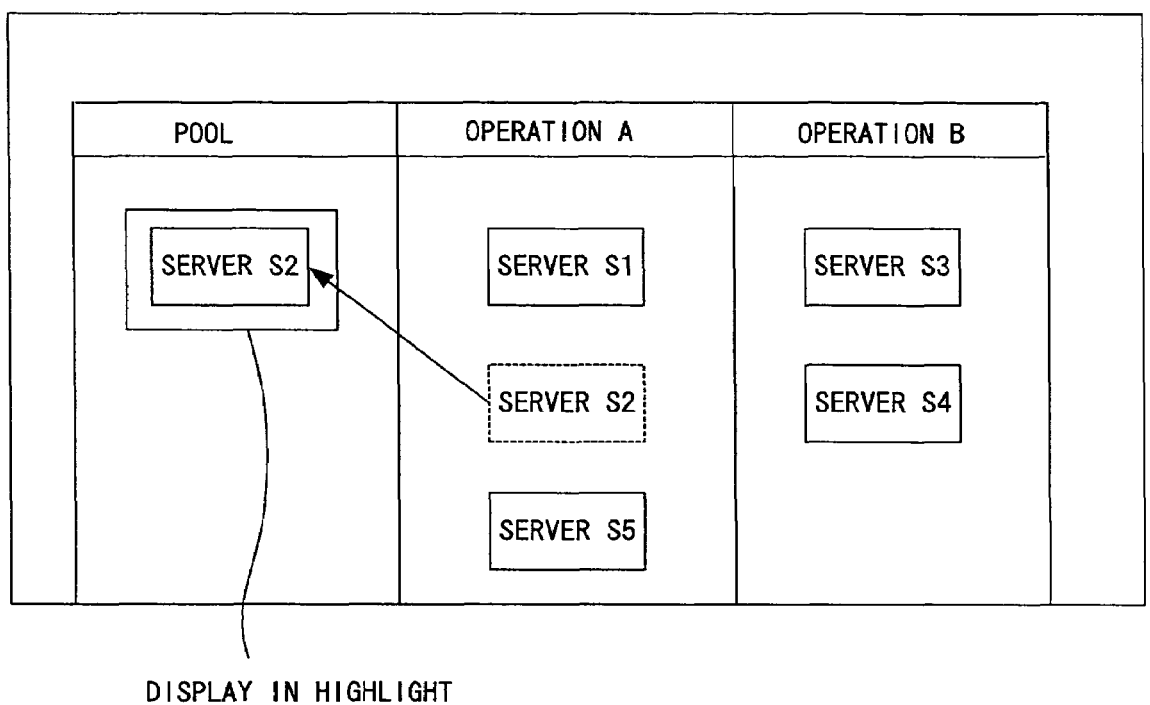
FIG. 21 is an explanatory diagram showing a display example in which a VLAN group of a server S2 is moved from the operation A to the pool.

FIG. 21 shows a display example of the display 11 on which devices grouped into VLAN groups are displayed. In FIG. 21, the server S2 that is in execution in the application A group is moved from the VLAN 201 to the pool VLAN 203.

The mouse (not shown) or the like of the management server 1 is manipulated to move the symbol representing the server S2 from the application A group to the pool group.

Figure 22:
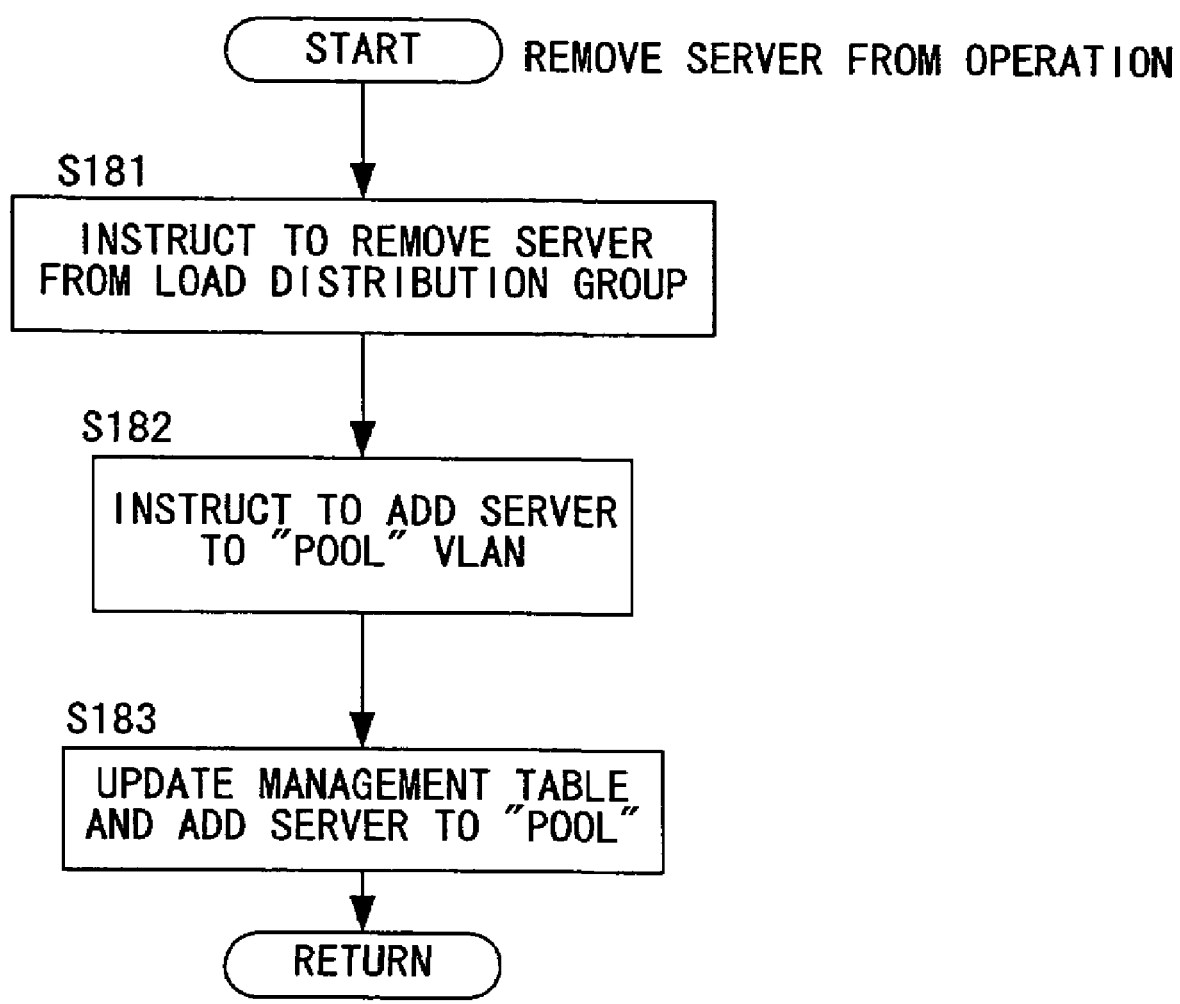
FIG. 22 is a flow chart showing an example of processing executed by the management server.

With the manipulation of the mouse or the like, the management server 1 instructs the load balancer 4 to remove the server S2 from the load balancing group for the application A as shown in a flow chart of FIG. 22 (a step S181). Thereafter, the management server 1 instructs the network switch 2 to reallocate the MAC address of the server S2 to the pool VLAN 203 (a step S182).

Then the VLAN group of the server S2 in the management table 120 is changed from application A to pool, the symbol of the server S2 moved is highlighted as shown in a frame in FIG. 21, and the processing ends (a step S183).

As has been described, configuration information of a new device (server) is created while the new device is added to the pool VLAN 203, which is a VLAN group assigned to no application, and then moved to an arbitrary VLAN group. Thus inconsistencies between a change in the load balancing group of the load balancer 4 and a change in the VLAN groups can be avoided and a new device can be moved between VLAN groups quickly and smoothly.

Although configuration information of a device connected to the network switch 2 is obtained by polling processing in the fourth embodiment of this invention, the fourth embodiment may be modified such that the network switch 2 sends the configuration information actively or a PING scan is executed as in the second or third embodiment.

In the fourth embodiment of this invention, an added server first belongs to the pool VLAN group to which no application is assigned. Alternatively, the added equipment may be directly assigned to a specific application if the management server 1 has a table in which the MAC address of an equipment is associated with an operation to which the equipment is to be assigned (hereinafter referred to as operation reservation table). In this case, a step of reading the application reservation table to obtain a group or VLAN to which the added server is to belong has to be provided prior to the step S160 of FIG. 17 (the steps S801 and 802 of FIG. 16). In the step S160, the server is added to the VLAN of the designated operation or the load balancing group instead of the pool VLAN or the load balancing group. Instead of designating an operation using the MAC address, the IP address may be used to reserve a device for an operation in the case where an IP address is set in advance to each equipment. These functions make it possible to automatically deploy a device for a designated operation by simply adding the device to the network, and thus lighten the burden of the system administrator even more.

The above embodiments describe the operation of a system which is managed in accordance with this invention for when a new server is added to the system. In contrast, the following fifth embodiment describes the operation required apply management according to this invention to an existing system to which management according to this invention has not been applied. To apply management by this invention to an existing system, the management server 1 has to recognize every network device and server connected to an existing network, and has to create the configuration management table 12 to display the configuration information.

In the existing system, processing has already been conducted and therefore, enough communication has been executed between devices connected to the network. This eliminates such processing as dummy communications for registering information of a new server added in the management table of the network switch 2. The management server only has to read the management tables 21, 22, and 23 of the network switch 2 and use the read information to recognize the system configuration.

Figure 23:
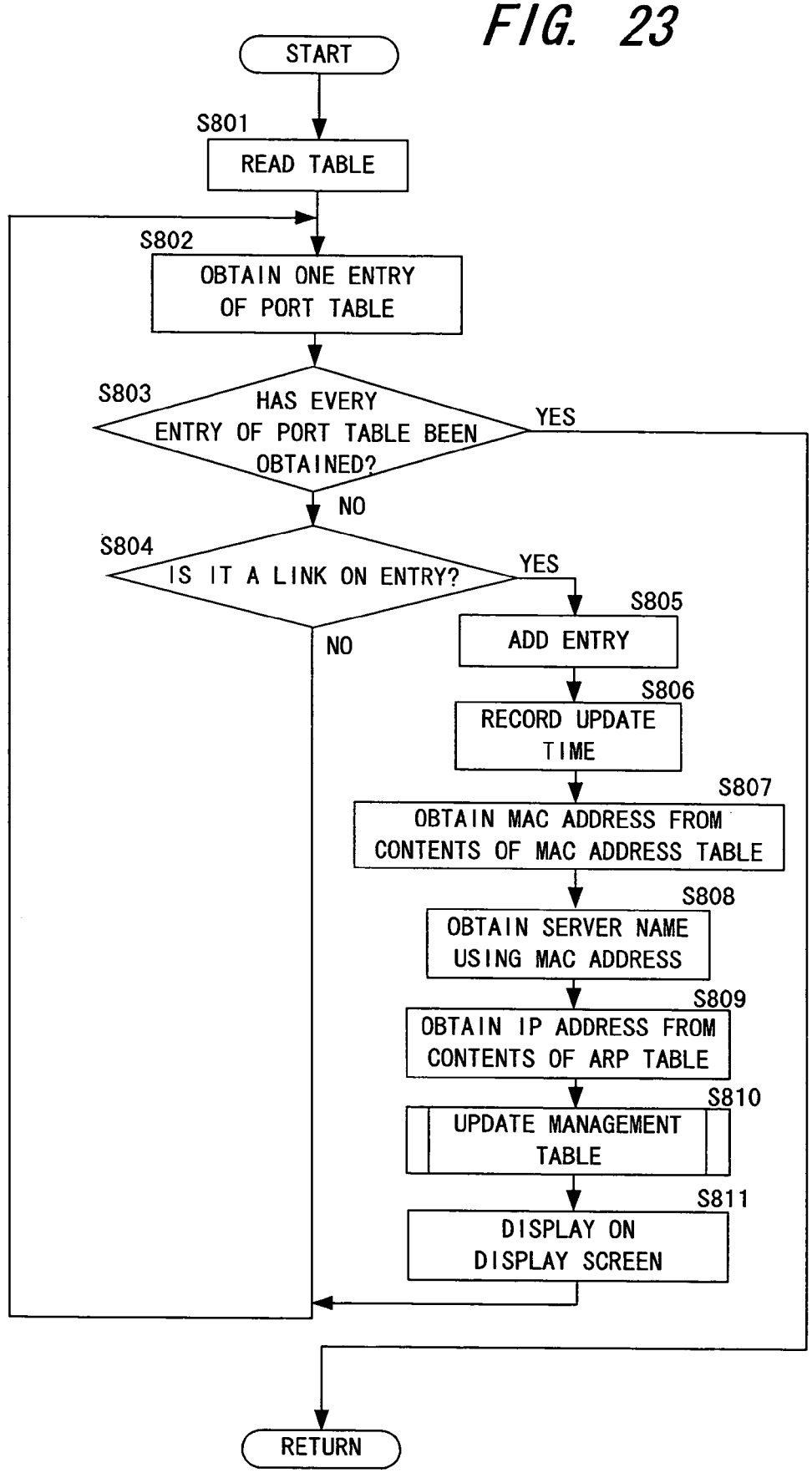
FIG. 23 is a flow chart showing an example of processing executed by the management server for when this invention is applied to an existing system.

FIG. 23 is a flow chart showing an example of processing executed by the management server for when this invention is applied to an existing system. The communication sequence in this case is exactly the same as the communication sequence of FIG. 6 and others just after the data reading step (step 512) where polling is performed on the switch. Therefore, a communication sequence diagram for this embodiment is omitted.

In FIG. 23, the management server first reads the management tables 21, 22, and 23 of the network switch 2 (a step S801). Based on the read information, the following processing is conducted:

One entry of the data of the port table 21 is obtained first (a step S802). This is repeated until every data entry in the port table 21 is read (every port of the switch is examined) (a step S803).

When the link state of the corresponding port is ON, the following processing is conducted (a step S804) (no processing is necessary when the link state is OFF):

First, an entry for the corresponding port is added to the configuration management table 12 (a step S805). Update time is recorded (a step S806) and then the MAC address of a server connected to the corresponding port is obtained from the contents of the MAC address table 22 which have been read in the step S801 (a step S807). A device name is obtained from the corresponding MAC address entry in the device management table 13 (a step S808). An IP address associated with the MAC address in question is obtained from the contents of the ARP table 23 which have been read in the step S801 (a step S809). The information obtained in the steps S806 through S809 is written in the entry of the management table 12 that has been added in the step S805 to complete the management table entry (a step S810). Lastly, information of the server in question is displayed on the console display 11 as shown in FIG. 8 (a step S811). In this embodiment, server information displayed is not of a newly added server but of an existing server of the system, and therefore is not highlighted.

Configuration information of the entire system is obtained by performing the above processing on every switch in the system.

The above processing makes it possible to introduce a management system of this invention into an existing system and to thereby recognize the system configuration. Once the system configuration is recognized in this way, the system configuration can be managed by the methods described in the first through fourth embodiments.

Configuration information on a device of the intra network is obtained by the management server 1 from the network switch 2 in the above embodiments. Equally detailed configuration information can be obtained from another network device such as the network switch 6, the load balancer 4, or the router (not shown). Device suitable to this purpose is a network device capable of specifying the correlation between a physical port and an identifier unique to one equipment such as the MAC address, and between the MAC address and the IP address (identifier on the network).

The above embodiments use the MAC address as a globally unique identifier (no two equipments share the same address) but this invention is not limited to the MAC address. Any identifier can be employed as long as it is capable of specifying equipment (hardware). For example, UUID (Universally Unique Identifier), which is a device identifier for discriminating individual equipments in UPnP (Universal Plug & Play), or a processor serial number implemented to discriminate individual CPUs may be employed.

Host computers in the above embodiments are servers. Storage systems such as disk arrays may also be included as host computers in management of the system.

As has been described, a data center management method according to this invention is capable of automatically collecting the physical location of a new device and its logical position such as an IP address to create configuration information of the device while keeping network traffics low. The data center management method is thus applicable to a management system, a management software, or a management server which manages many servers in a data center or the like.

While the present invention has been described in detail and pictorially in the accompanying drawings, the present invention is not limited to such detail but covers various obvious modifications and equivalent arrangements, which fall within the purview of the appended claims.

What is claimed is:

1. A device management method for a data center having plural host computers and network devices and a management module, the management module monitoring the host computers and network devices to collect information on configurations of the host computers and network devices, the management module managing the host computers and network devices based on the collected configuration information, the method comprising the steps of:
    detecting a physical location of a host computer or network device connected to a network device that is to be monitored;
    collecting a globally unique first identifier which is unique to a host computer or network device equipment connected to the network device to be monitored and is not shared by the equipments; and
    creating the configuration information from the first identifier and from the physical connection location of the network device to be monitored,
    wherein the network device to be monitored connects the host computers while dividing the host computers into plural virtual networks, and
    wherein upon detecting addition of a new host computer to the network device to be monitored, the management module adds the added host computer to a virtual network previously set and chosen out of the plural virtual networks.

2. The device management method for a data center according to claim 1, further comprising the steps of:
    collecting a network identifier given to a host computer or network device connected to the network device to be monitored; and
    creating the configuration information from the first identifier, from the physical connection location of the network device, and from the network identifier.

3. The device management method for a data center according to claim 1,
    wherein the management module requests, at a predetermined cycle, the physical connection location, and the first identifier from the network device to be monitored.

4. The device management method for a data center according to claim 1, wherein, when a change in connection state occurs, the network device to be monitored sends the physical connection location and the first identifier to the management module.

5. The device management method for a data center according to claim 1, wherein the first identifier is collected after a host computer or network device connected to the network device to be monitored communicates voluntarily.

6. The device management method for a data center according to claim 1, wherein the management module collects the first identifier after a network to which the network device to be monitored belongs is scanned.

7. The device management method for a data center according to claim 1, further comprising the step of obtaining a device name of the host computer or network device using the first identifier, wherein the configuration information is created from the first identifier, from the physical connection location of the network device, and from the device name.

8. A device management server, comprising:
a computer device;
and a memory storing a program executable by the computer device, the program being comprised of a plurality of modules, said modules including:
a configuration information collecting module, which monitors plural host computers and network devices in a data center and which collects information on configuration of the host computers and network devices to be used in management of the host computers and network devices; and
a VLAN setting module which instructs the network device to connect the host computers while dividing the host computers into plural virtual networks,
wherein the configuration information collecting module comprises:
a location detecting module which detects a physical connection location of a host computer or network device connected to a network device that is to be monitored;
a first identifier collecting module which collects a globally unique first identifier, which is unique to a host computer or network device equipment connected to the network device to be monitored and is not shared by the network device equipment; and
a configuration information creating module which creates the configuration information from the first identifier and from the physical connection location of the network device,
wherein when the location detecting module detects addition of a new host computer to a network device to be monitored, the VLAN setting module adds the added host computer to a virtual network previously set and chosen out of the plural virtual networks.

9. The device management server according to claim 8, wherein the configuration information collecting module comprises network identifier collecting module which collects a network identifier given to a host computer or network device connected to the network device to be monitored, and
wherein the configuration information creating module creates the configuration information from the first identifier, from the physical connection location of the network device, and from the network identifier.

10. The device management server according to claim 8,
wherein the location detecting module requests, at a predetermined cycle, the physical connection location from the network device to be monitored, and
wherein the first identifier collecting module requests, after a new host computer or network device is detected, a first identifier from the network device.

11. The device management server according to claim 8,
wherein the first identifier collecting module collects the first identifier after a host computer or network device connected to the network device to be monitored communicates voluntarily.

12. The device management server according to claim 8,
wherein the first identifier collecting module collects the first identifier after a network to which the network device to be monitored belongs is scanned.

13. The device management server according to claim 8, further comprising device name collecting module which collects a device name of the host computer or network device using the first identifier,
wherein the configuration information creating module creates the configuration information from the first identifier, from the physical connection location of the network device, and from the device name.

14. A device management system for a data center having plural host computers and network devices which monitors the host computers and network devices to collect information on configurations of the host computers and network devices, and manages the host computers and network devices based on the collected configuration information, the system comprising:
a computer device;
and a memory storing a program executable by the computer device, the program being comprised of a plurality of modules, said modules including:
a physical location detecting module which detects a physical location of a host computer or network device connected to a network device that is to be monitored;
a first identifier collecting module which collects a globally unique first identifier which is unique to a host computer or network device equipment connected to the network device to be monitored and is not shared by the network device equipment; and
a configuration information creating module which creates the configuration information from the first identifier and from the physical connection location of the network device to be monitored,
wherein the network device to be monitored connects the host computers while dividing the host computers into plural virtual networks, and
wherein upon detecting addition of a new host computer to the network device to be monitored, the management module adds the added host computer to a virtual network previously set and chosen out of the plural virtual networks.

15. The device management system for a data center according to claim 14, further comprising network identifier collecting module which collects a network identifier given to a host computer or network device connected to the network device to be monitored,
wherein the configuration information creating module creates the configuration information from the first identifier, from the physical connection location of the network device, and from the network identifier.

16. The device management system for a data center according to claim 14, wherein the physical location detecting module requests, at a predetermined cycle, the physical connection location from the network device to be monitored, and
wherein the first identifier collecting module requests, after a new host computer or network device is detected, a first identifier from the network device.

17. The device management system for a data center according to claim 14, wherein, when a change in connection state occurs, the network device to be monitored sends the physical connection location to the physical location detecting module and sends the first identifier to the first identifier collecting module.

18. The device management system for a data center according to claim 14, wherein the first identifier collecting module collects the first identifier after a host computer or network device connected to the network device to be monitored communicates voluntarily.

19. The device management system for a data center according to claim 14, wherein the first identifier collecting module collects the first identifier after a network to which the network device to be monitored belongs is scanned.

20. The device management system for a data center according to claim 14, further comprising device name collecting module which collects a device name of the host computer or network device using the first identifier, wherein the configuration information creating module creates the configuration information from the first identifier, from the physical connection location of the network device, and from the device name.

21. A program stored in a memory executable by a computer device for monitoring plural host computers and network devices in a data center and collecting information on configuration of the host computers and network devices, the program comprising:

a location detecting module which detects a physical connection location of a host computer or network device connected to a network device that is to be monitored;

a first identifier collecting module which collects a globally unique first identifier, which is unique to a host computer or network device equipment connected to the network device to be monitored and is not shared by the equipments; and a configuration information creating module which creates the configuration information from the first identifier and from the physical connection location on the network device; and a VLAN setting module which instructs the network device to connect the host computers while dividing the host computers into plural virtual networks, wherein when the location detecting module detects addition of a new host computer to the network device to be monitored, the VLAN setting module adds the added host computer to a virtual network previously set and chosen out of the plural virtual networks.

22. The program according to claim 21, wherein the configuration information collecting module comprises network identifier collecting module which collects a network identifier given to a host computer or network device connected to the network device to be monitored, and wherein the configuration information creating module creates the configuration information from the first identifier, from the physical connection location of the network device, and from the network identifier.

23. The program according to claim 21, wherein the location detecting module requests, at a predetermined cycle, the physical connection location from the network device to be monitored, and wherein the first identifier collecting module requests, after the location detecting module detects a new host computer or network device, a first identifier from the network device.

24. The program according to claim 21, wherein the first identifier collecting module collects the first identifier after a host computer or network device connected to the network device to be monitored communicates voluntarily.

25. The program according to claim 21, wherein the first identifier collecting module collects the first identifier after a network to which the network device to be monitored belongs is scanned.

26. The program according to claim 21, further comprising device name collecting module which collects a device name of the host computer or network device using the first identifier, wherein the configuration information creating module creates the configuration information from the first identifier, from the physical connection location of the network device, and from the device name.

* * * * *